May 24, 1949.　　　　E. ORSHANSKY, JR　　　　2,471,117
POWER TRANSMISSION

Filed May 12, 1945　　　　　　　　　　17 Sheets-Sheet 1

INVENTOR.
Elias Orshansky, Jr.
BY
ATTORNEYS

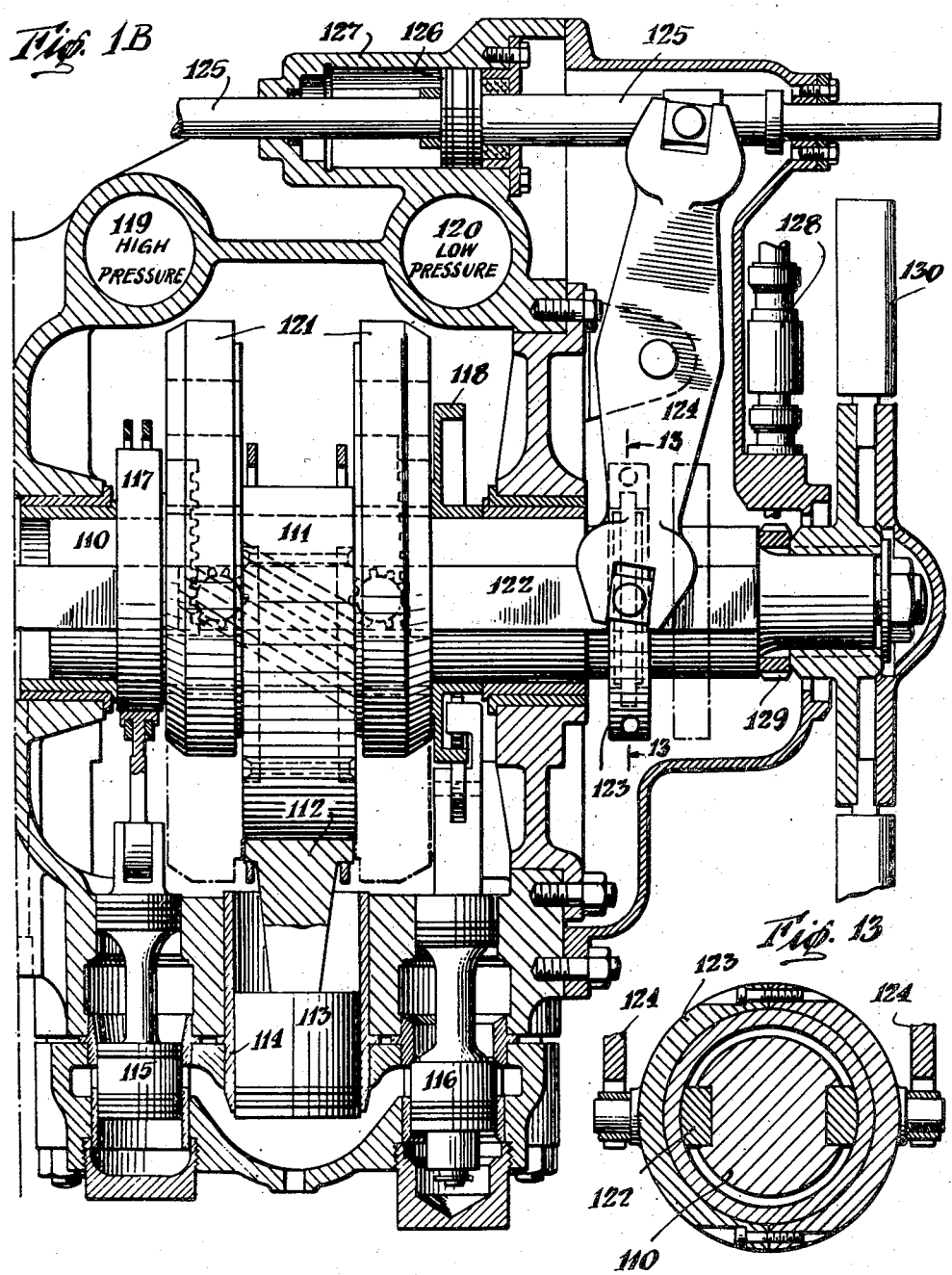

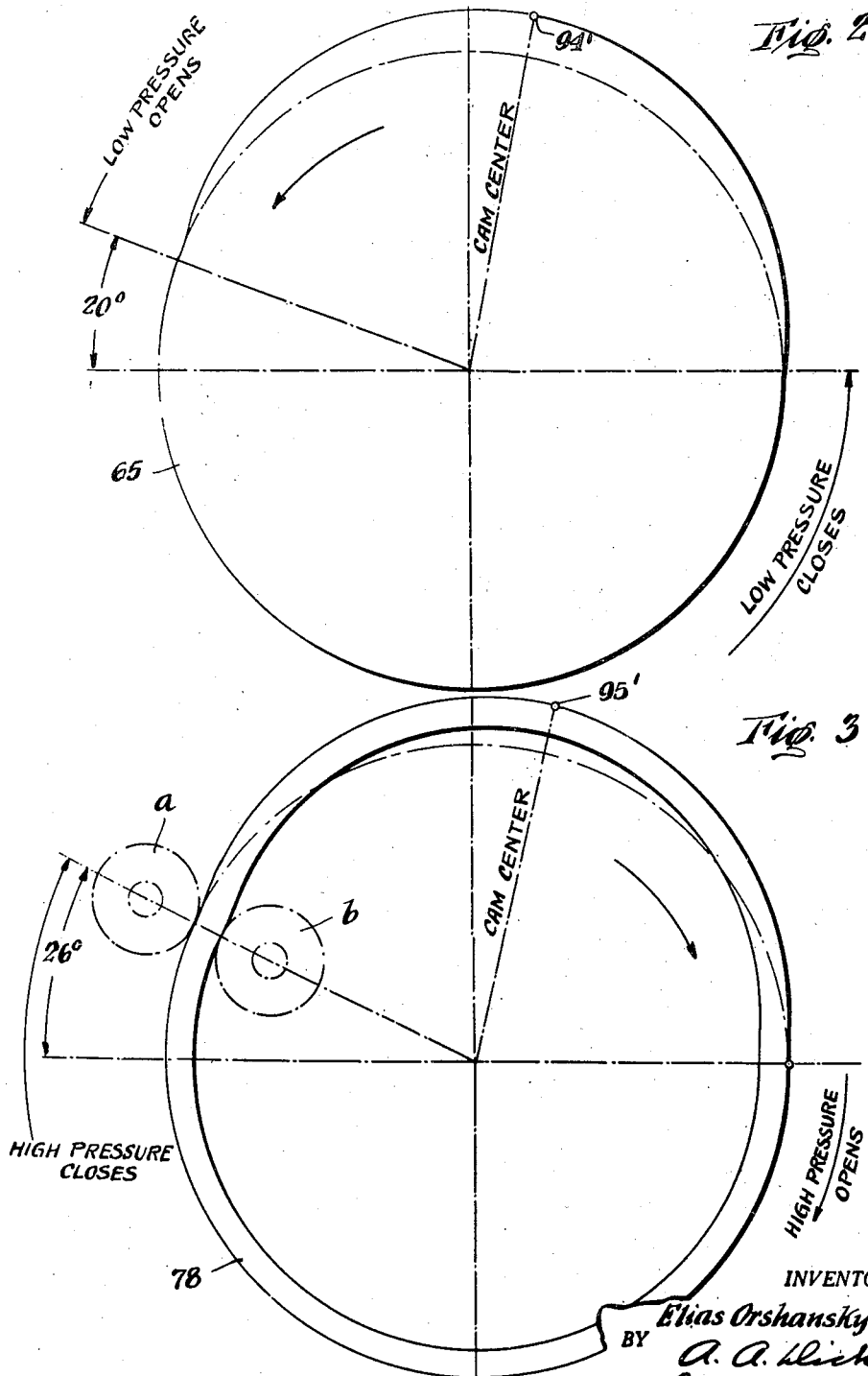

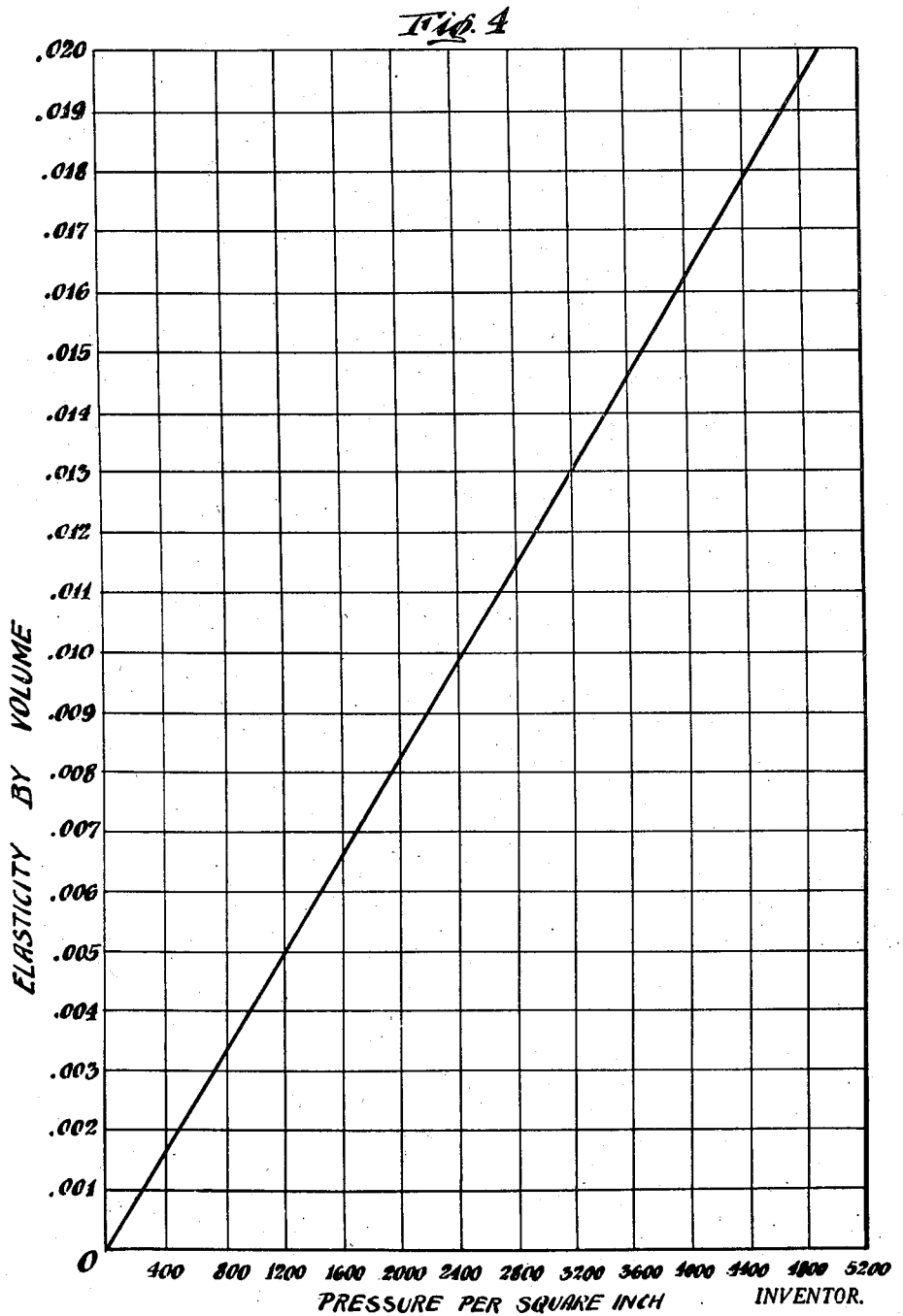

May 24, 1949.  E. ORSHANSKY, JR  2,471,117
POWER TRANSMISSION

Filed May 12, 1945  17 Sheets-Sheet 5

INVENTOR.
Elias Orshansky, Jr.
BY
ATTORNEYS

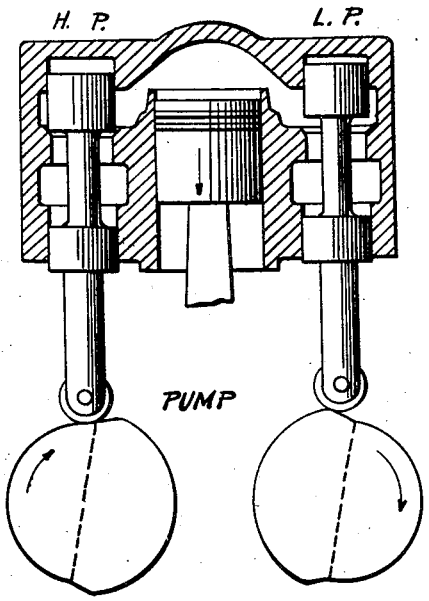
Fig. 8 PUMP
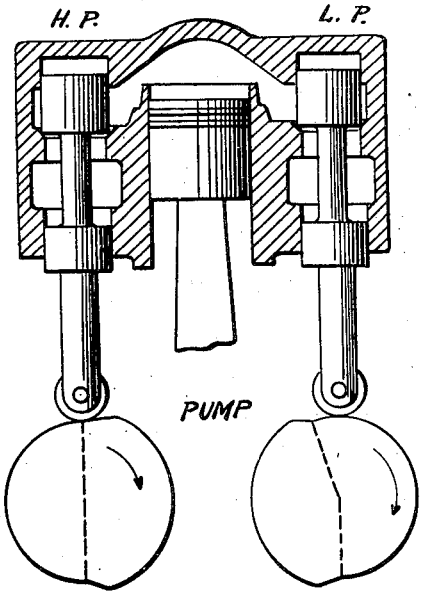
Fig. 9 PUMP
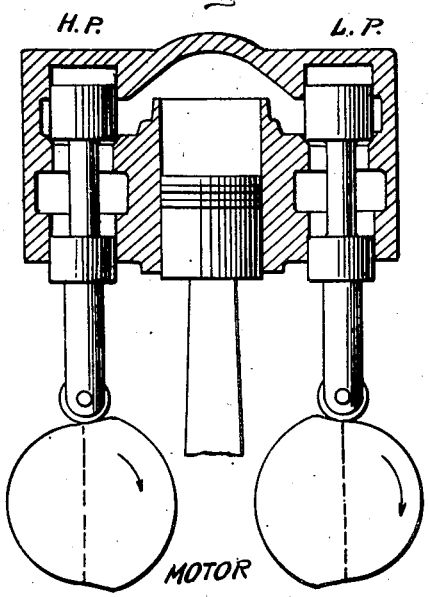
Fig. 10 MOTOR
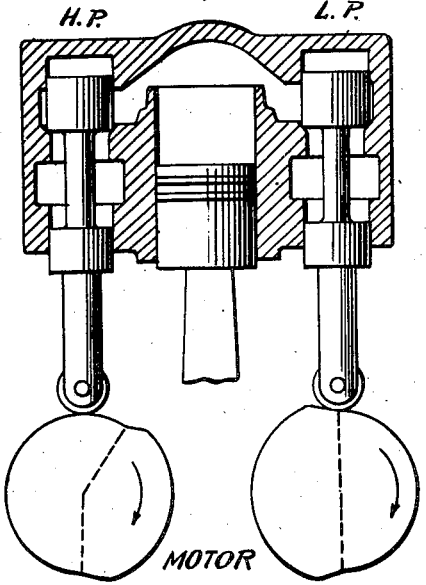
Fig. 11 MOTOR INVENTOR
Elias Orshansky, Jr.
BY
ATTORNEYS May 24, 1949. E. ORSHANSKY, JR 2,471,117
POWER TRANSMISSION
Filed May 12, 1945 17 Sheets-Sheet 8
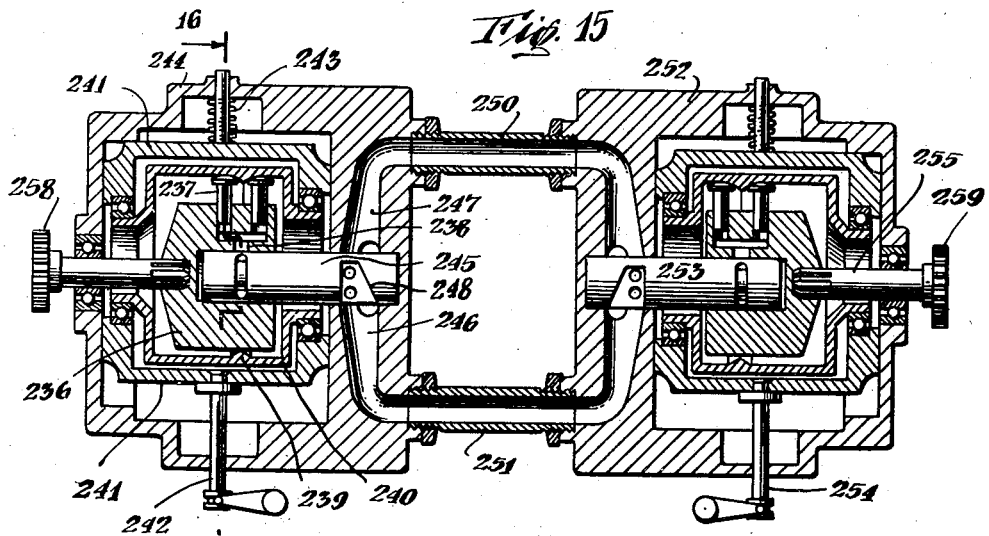
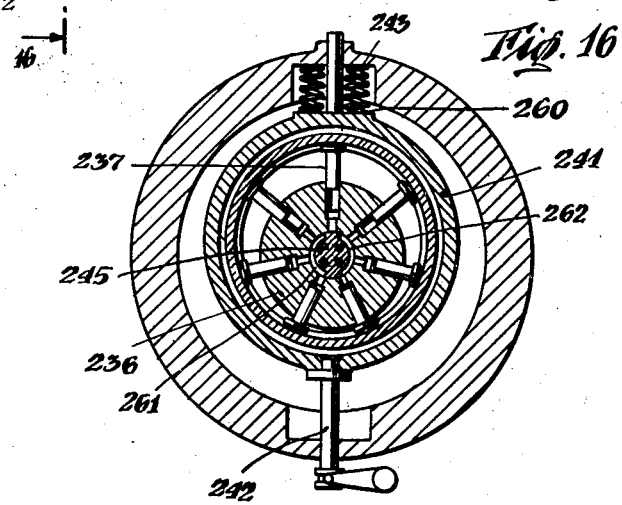
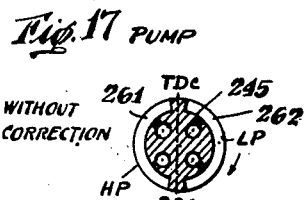
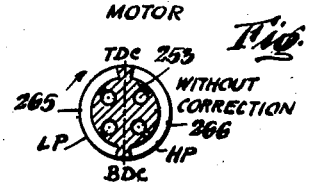
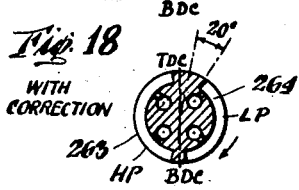
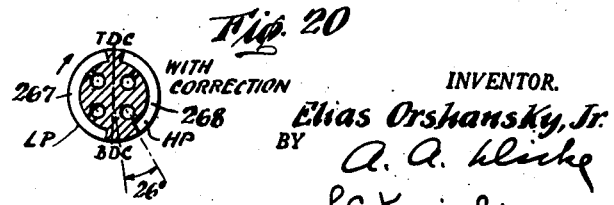
INVENTOR.
Elias Orshansky, Jr.
BY
ATTORNEYS

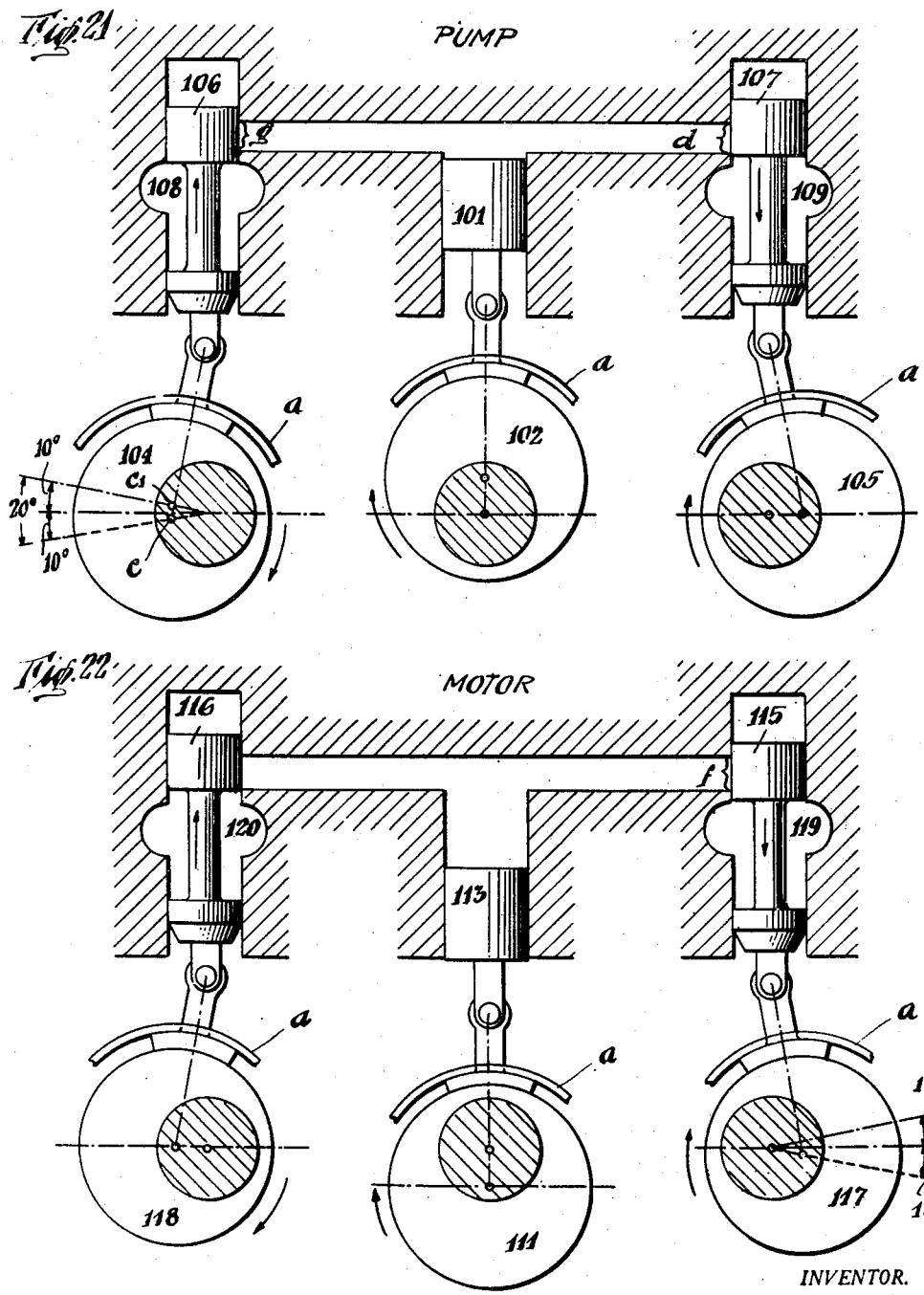

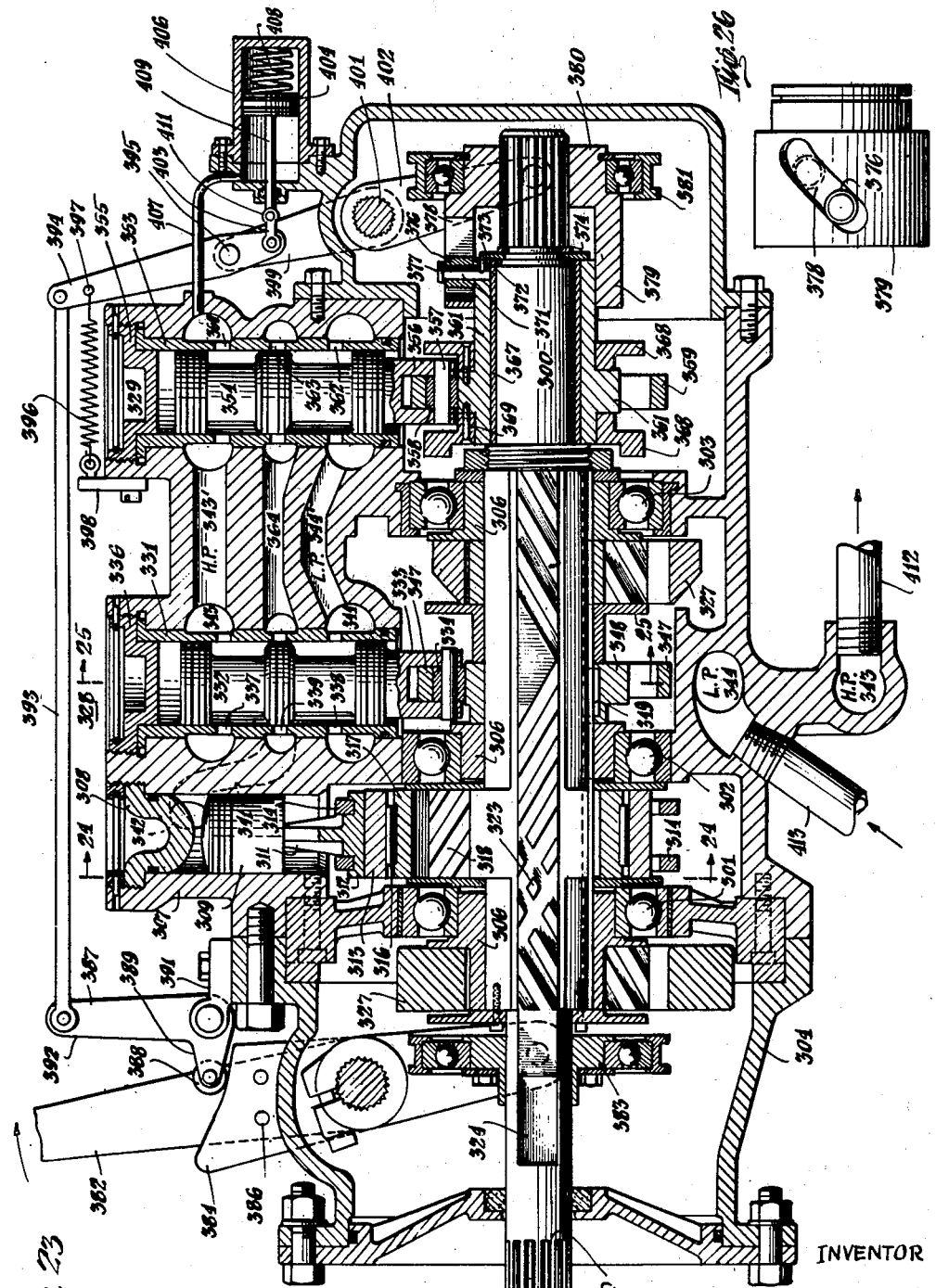

May 24, 1949. E. ORSHANSKY, JR 2,471,117
POWER TRANSMISSION
Filed May 12, 1945 17 Sheets-Sheet 11
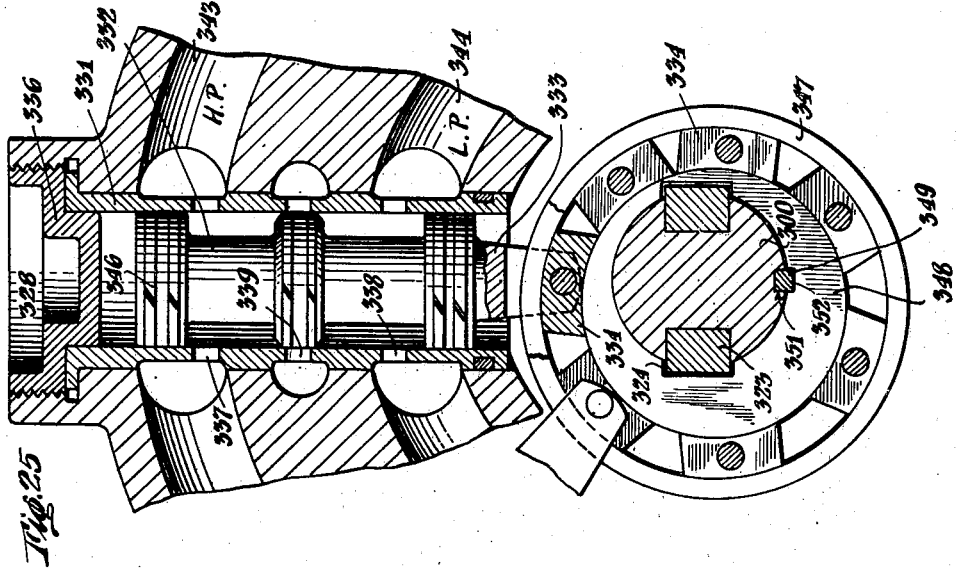
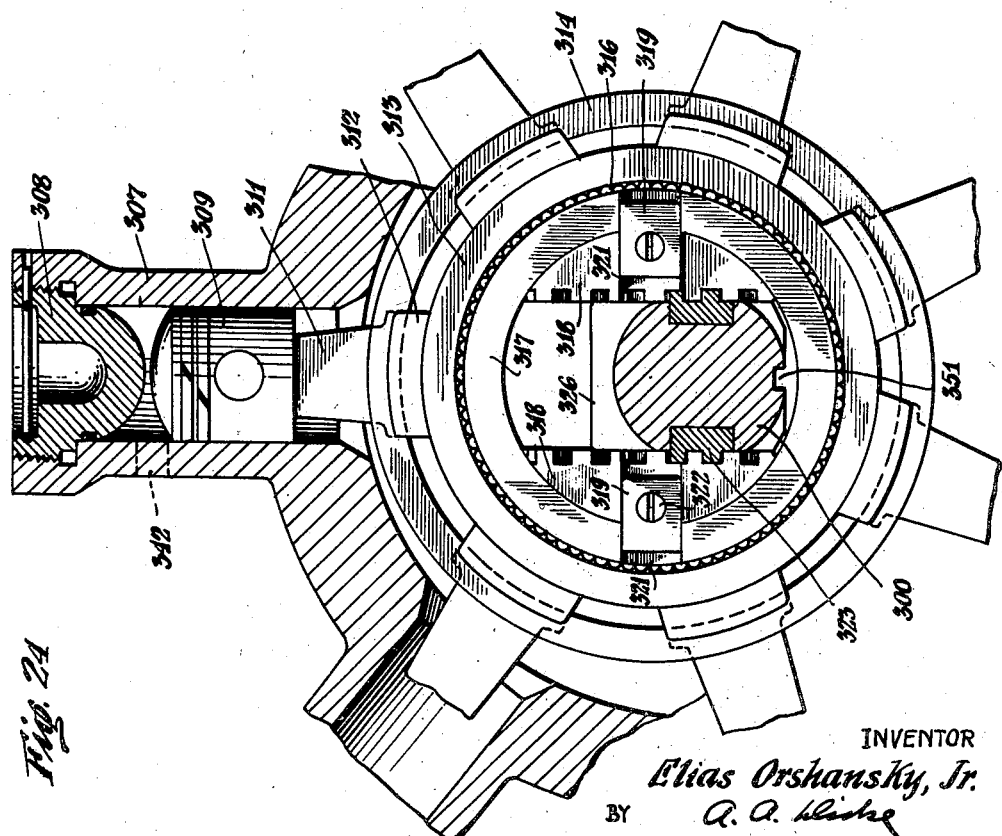
INVENTOR
Elias Orshansky, Jr.
BY
ATTORNEYS May 24, 1949.  E. ORSHANSKY, JR  2,471,117
POWER TRANSMISSION
Filed May 12, 1945  17 Sheets-Sheet 12

25% STROKE
100% LOAD

100% STROKE
100% LOAD

INVENTOR
Elias Orshansky, Jr.
BY
ATTORNEYS

May 24, 1949.　　　　　E. ORSHANSKY, JR　　　　　2,471,117
POWER TRANSMISSION
Filed May 12, 1945　　　　　　　　　　　　　　　17 Sheets-Sheet 13
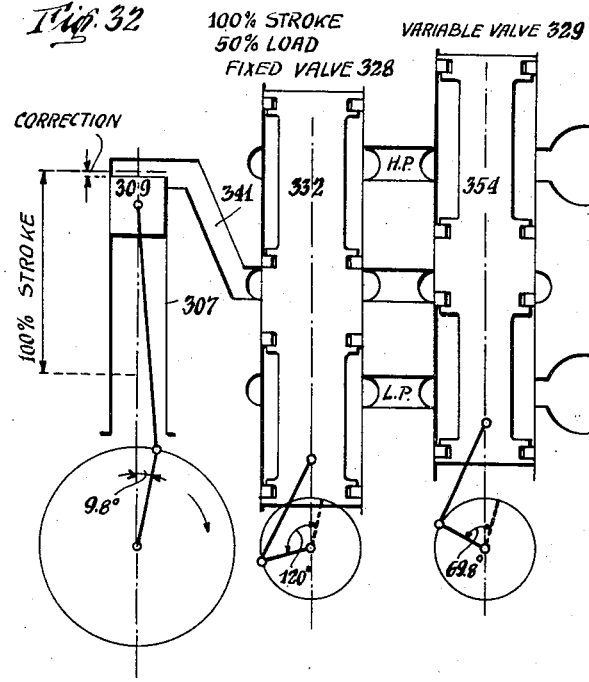
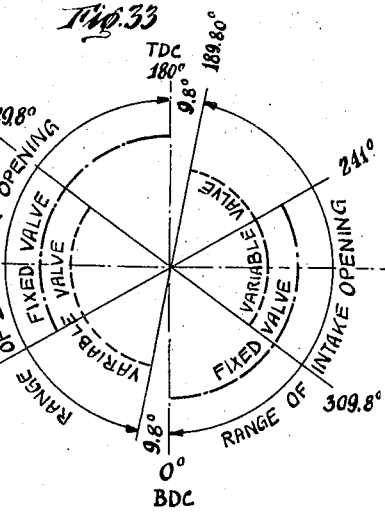
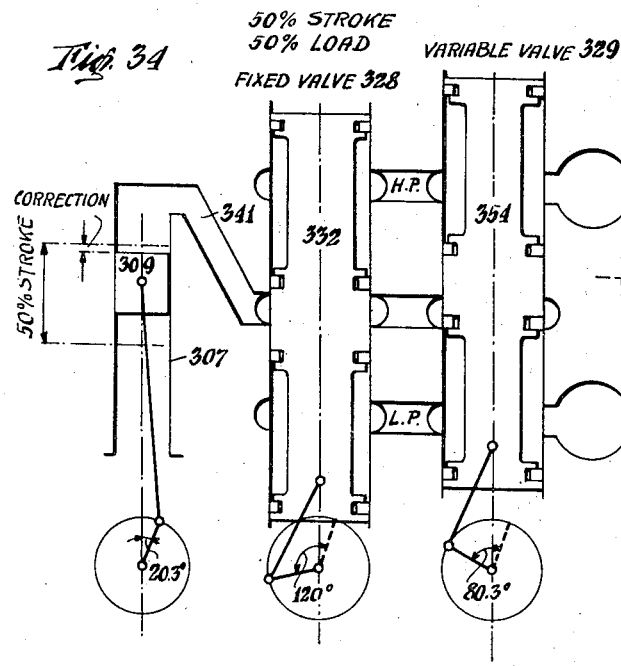
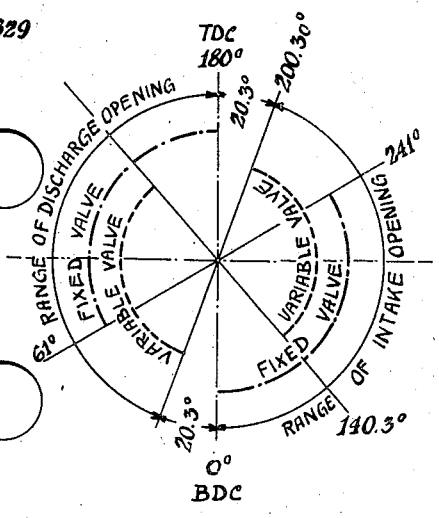
INVENTOR
*Elias Orshansky, Jr.*
BY
ATTORNEYS May 24, 1949.　　　　　E. ORSHANSKY, JR　　　　　2,471,117
POWER TRANSMISSION
Filed May 12, 1945　　　　　　　　　　　　　17 Sheets-Sheet 15

INVENTOR
Elias Orshansky, Jr.
BY
ATTORNEYS

May 24, 1949.  E. ORSHANSKY, JR  2,471,117
POWER TRANSMISSION
Filed May 12, 1945  17 Sheets-Sheet 16
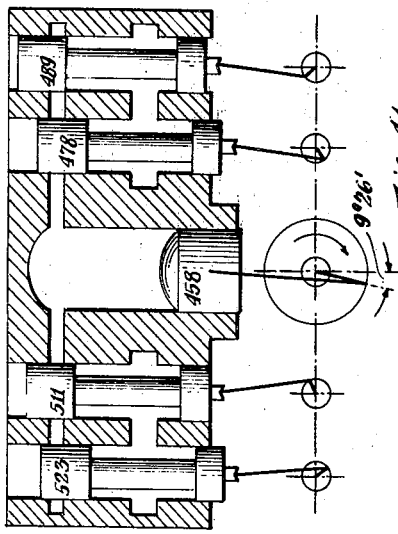
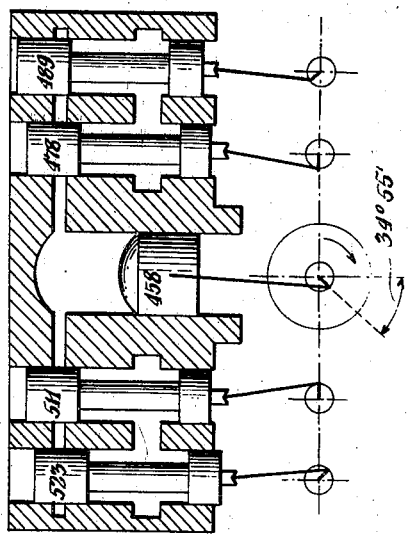
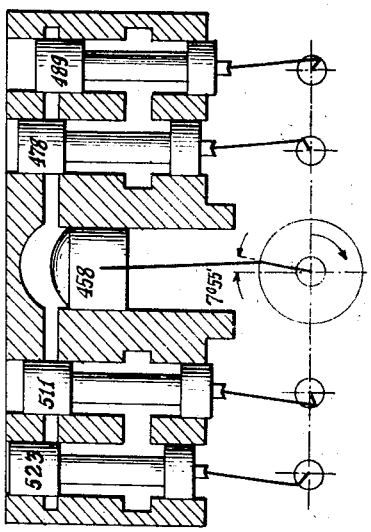
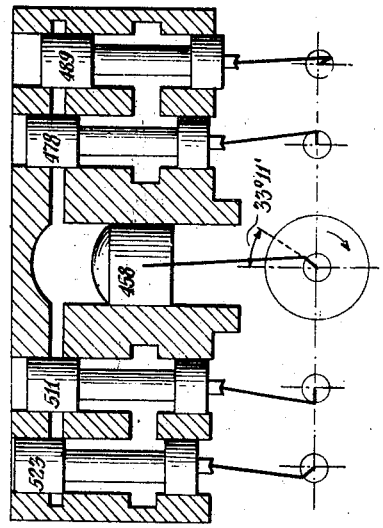
INVENTOR
Elias Orshansky, Jr.
BY
ATTORNEYS

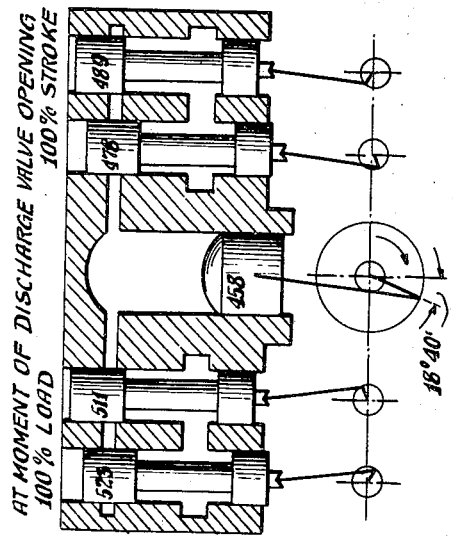
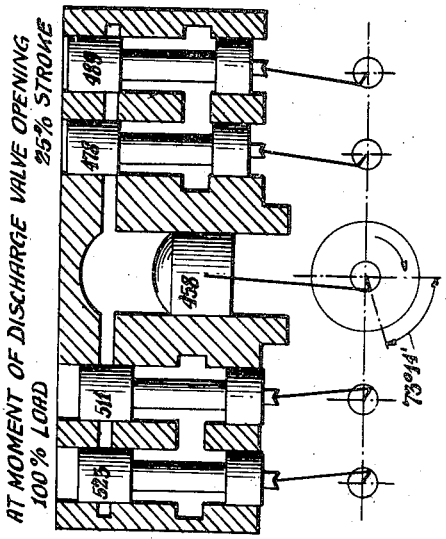
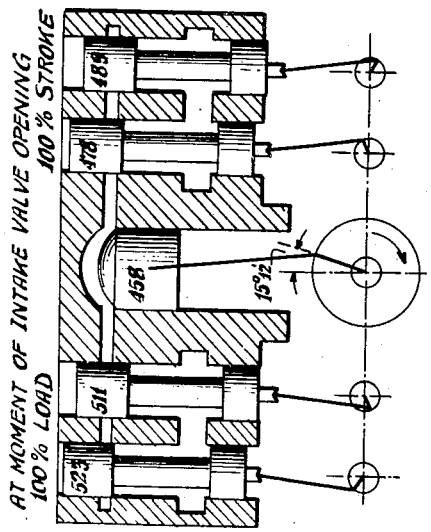
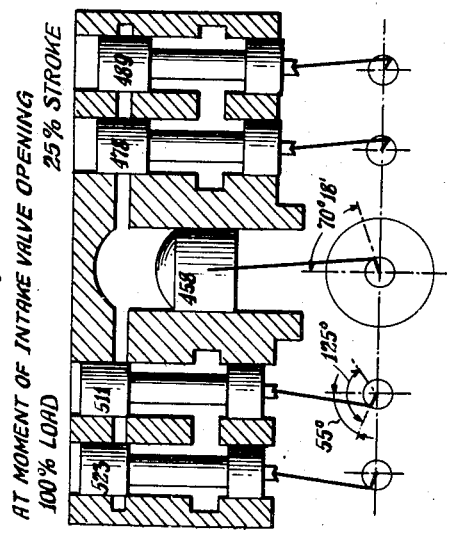

Patented May 24, 1949

2,471,117

UNITED STATES PATENT OFFICE 2,471,117

POWER TRANSMISSION

Elias Orshansky, Jr., Stamford, Conn., assignor to The Aerotorque Company, Stamford, Conn., a corporation of Connecticut Application May 12, 1945, Serial No. 593,417

35 Claims. (Cl. 103—174)

This invention relates to power transmissions, particularly to hydraulic transmissions of the variable speed ratio type, and has for its principal object to provide an improved transmission in which the losses ordinarily caused by elasticity of the liquid and of the associated mechanical elements are automatically eliminated, this being accomplished by causing the energy stored in the compressed liquid to be utilized in assisting the prime mover to drive the pistons.

This application is a continuation-in-part of my application Serial Number 426,988, filed January 16, 1942, now abandoned.

According to accepted mathematical analysis, a detailed explanation of which is disclosed hereinafter, certain predetermined efficiencies should be achieved in operating transmissions of the type disclosed in my prior Patents 2,173,855 and 2,173,856 of September 26, 1939, 2,217,405 of October 15, 1940, 2,219,052 of October 22, 1940, and 2,-256,324 of September 16, 1941. In actual practice, however, it has been found that, while these transmissions operate in a more improved manner than similar transmissions of the prior art, still, the efficiencies achieved were substantially lower than those calculated. The losses were first attributed to liquid leakage at the valves and pistons, in view of the employment of high pressures, but tests have indicated that despite elimination of valve and piston leakage the efficiencies were still below the calculated values friction losses, of course, being taken into account.

Furthermore, it has been found in transmissions of the above type embracing a pump-motor combination, each of which includes pistons reciprocating within cylinders, that the losses varied inversely with the length of the piston stroke, that is, the shorter the piston stroke the greater the loss and, consequently, the lower the efficiency therof. In fact, a point in the reduction of the piston stroke may be reached where no liquid can be transmitted, rotation of the output shaft thereupon ceasing, so that the efficiency becomes zero.

It has been discovered that the above losses are attributable substantially to the elasticity of the elements of the hydraulic system. By the term "elasticity" is meant the compressibility and expansibility of the liquid, as well as the compressibility and expansibility of the component parts of the transmission, such as the cylinders, pistons, connecting rods, shaft, etc.

A careful analysis of the operating test data for the above transmission has revealed that the losses closely paralleled those that would be expected to occur incident to liquid leakage, thus previously leading one to erroneously conclude that the losses were caused by leakage. However, since the leakage factor was substantially eliminated in the above tests, further tests were conducted to provide means, such as variations in valve timing, for preventing losses brought about by the above-described elasticity of the hydraulic system.

In analyzing the operating characteristics of a pump or motor cylinder and piston forming a part of a transmission, not only the volume of the displaced liquid but the volume of the liquid remaining in the cylinder, namely, the undisplaced volume of liquid, must particularly be considered in order to correct for the above elasticity manifestations. For example, assuming a constant volume of liquid in the cylinder head, it can be readily seen that at maximum piston stroke the volume of liquid therein is at a minimum value, whereas, as the length of the piston stroke is decreased from its maximum point to its minimum or substantially zero point, the volume of residual liquid within the cylinder increases to a maximum value at zero stroke. Correspondingly, as the residual liquid in the cylinder and cylinder head increases, the losses caused by the elasticity of the liquid, etc. increase and the efficiency of the pump or motor consequently decreases. It was thus discovered that for hydraulic units of the above type the greater the amount of undisplaced liquid within the cylinder and cylinder head the greater the losses and the greater is the correction required, i. e., the greater the points of valve opening and/or closing must be adjusted from top and bottom positions of the pistons.

It is, therefore, an object of the invention to provide an improved transmission in which the hereinbefore-mentioned losses resulting from elasticity of the hydraulic system are substantially eliminated.

It is another object of the invention to provide an improved transmission of high efficiency.

It is yet another object of the invention to provide a transmission in which the mechanical connection between the driving and driven members is eliminated and in which a variable torque and speed drive results purely by the transmission of force from one member to the other through the medium of a liquid; a transmission of this type nevertheles embodying a structure such that substantially the entire energy will be delivered in the form of power to the driven member.

It is still another object of the invention to provide in an improved hydraulic unit of the displacement type an arrangement whereby the valve timing is varied in accordance with the hydraulic pressure.

It is a further object of the invention to provide in an improved hydraulic unit of the positive-displacement type an arrangement whereby the valve timing is varied in accordance with the length of the piston stroke.

It is a still further object of the invention to provide in an improved hydraulic unit of the positive-displacement type an arrangement whereby the valve timing is varied in accordance with the piston stroke and the hydraulic pressure of the system.

With the above objects in view, one aspect of the invention resides in a hydraulic displacement unit in which a working piston has associated therewith a valve mechanism adapted to delay the instant at which the valve port is opened to permit passage of liquid into the cylinder.

Another aspect of the invention resides in a hydraulic unit of the positive-displacement type wherein a working piston has associated therewith a composite double-acting valve structure the timing of which is automatically responsive to pressure of the high pressure passage and/or to the length of stroke of the working piston for varying the opening and closing instants of the valve port.

Still another aspect of the invention resides in a variable hydraulic pump unit of the positive-displacement type wherein a working piston actuated by a variable stroke operating means (such as an adjustable eccentric) has associated therewith a composite valve timing means that is responsive both to the position of said variable-stroke piston-operating means and to the pressure of the high pressure passage for automatically varying the opening and closing times of the valve port or ports.

Yet another aspect of the invention resides in such a device wherein a pair of valve means (bodies), connected in parallel, is employed for controlling the opening and closing instants of the working piston valve port or ports, said valve operating means being responsive to pressure changes and/or changes in the length of the working piston stroke.

A further aspect of the invention resides in a hydraulic pump unit of the positive-displacement type wherein a working piston has associated therewith a pair of composite single-acting valve piston structures adapted to respectively vary the intake and discharge port opening and closing instants in response to pressure in the high pressure passage and length of stroke of the working piston.

Still a further aspect resides in a pair of composite valve structures for a working piston wherein one pair of valve pistons, connected in parallel, is employed for controlling the opening and closing periods of the working piston cylinder intake port while the other pair of valve pistons, also connected in parallel, is employed for controlling the opening and closing periods of the working piston cylinder discharge port, said valve structures being responsive to pressure changes and/or changes in the length of the piston stroke.

Yet a further aspect of the invention resides in a pair of composite valve structures for a working piston wherein the composite valves for the intake and discharge ports are independently responsive to the pressure variations of the high pressure passage and/or changes in the length of the piston stroke.

These and other aspects of the invention will be more fully described in the following specification taken in connection with the accompanying drawings in which:

Fig. 1B is a similar view of the rear portion of the transmission shown in Fig. 1A;

Figs. 2 and 3 are diagrammatic and exaggerated views of cams that may be employed for the control of the pump and motor of the transmission shown in Figs. 1A and 1B;

Fig. 4 is a curve illustrating the elasticity by volume of the liquid as it is subjected to increasing pressure;

Fig. 8 is a diagrammatic representation of a cylinder assembly of the pump and associated cams without elasticity correction;

Fig. 9 is a view similar to Fig. 8 except that the pump is provided with a fixed elasticity correction;

Fig. 10 is a view similar to Fig. 8 but illustrating a motor cylinder assembly without elasticity correction;

Fig. 11 is a view corresponding to Fig. 10 with the motor parts provided with a fixed elasticity correction;

Fig. 13 is a transverse sectional view taken along line 13—13 of Fig. 1B;

Fig. 15 is a view illustrating a transmission of the radial piston, pintle type;

Fig. 16 is a transverse sectional view taken along line 16—16 of Fig. 15;

Figure 1A:
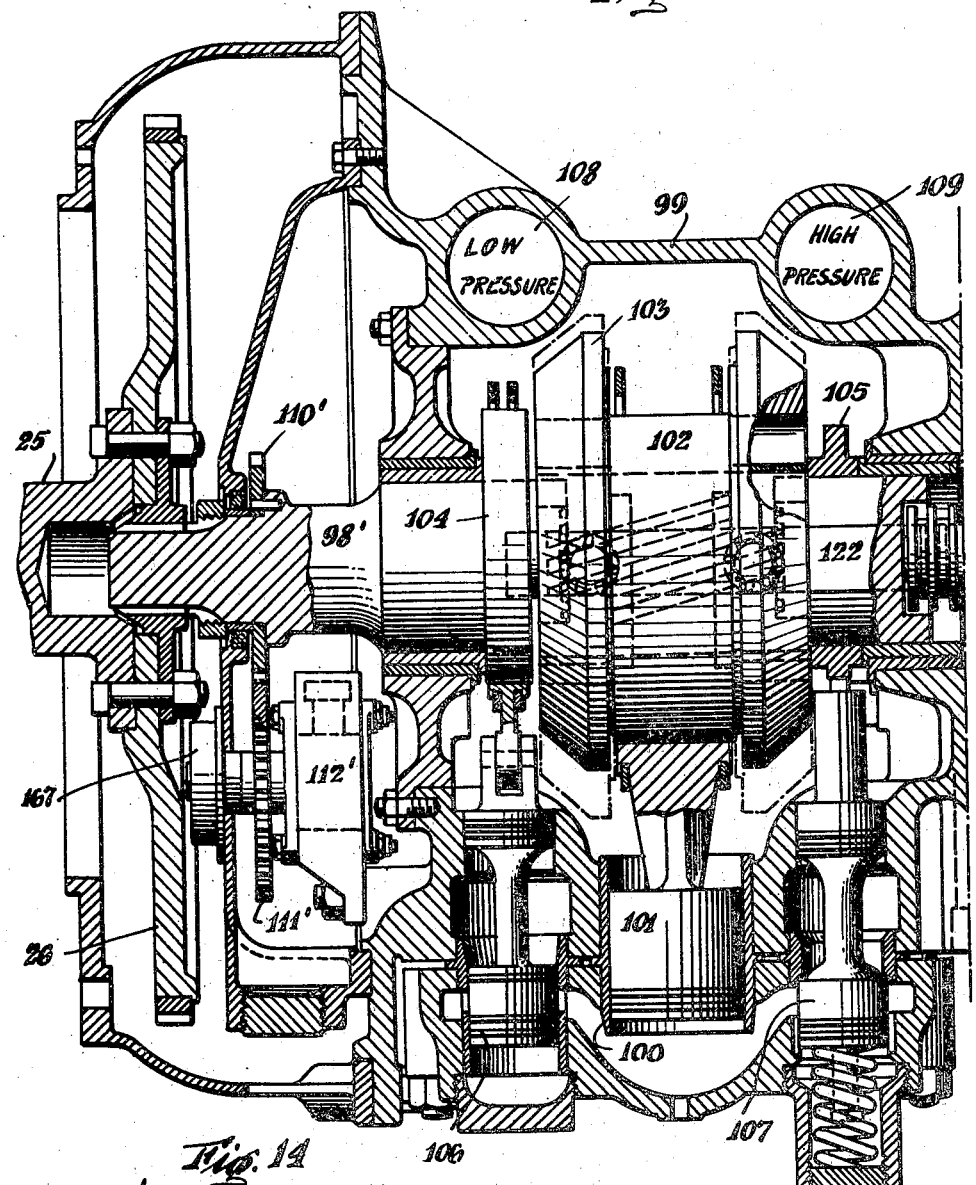
Fig. 1A is a sectional side view of the forward portion of a transmission in which a fixed elasticity correction is employed.
Figure 27:
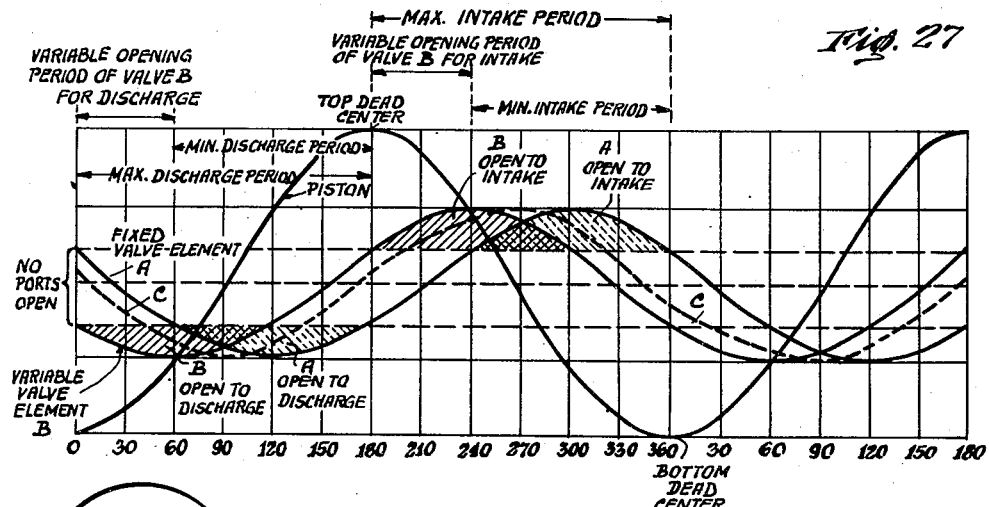
Figure 49:
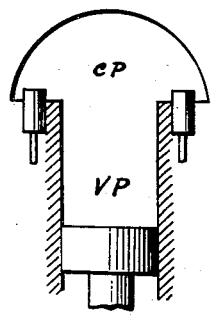
Figure 36:
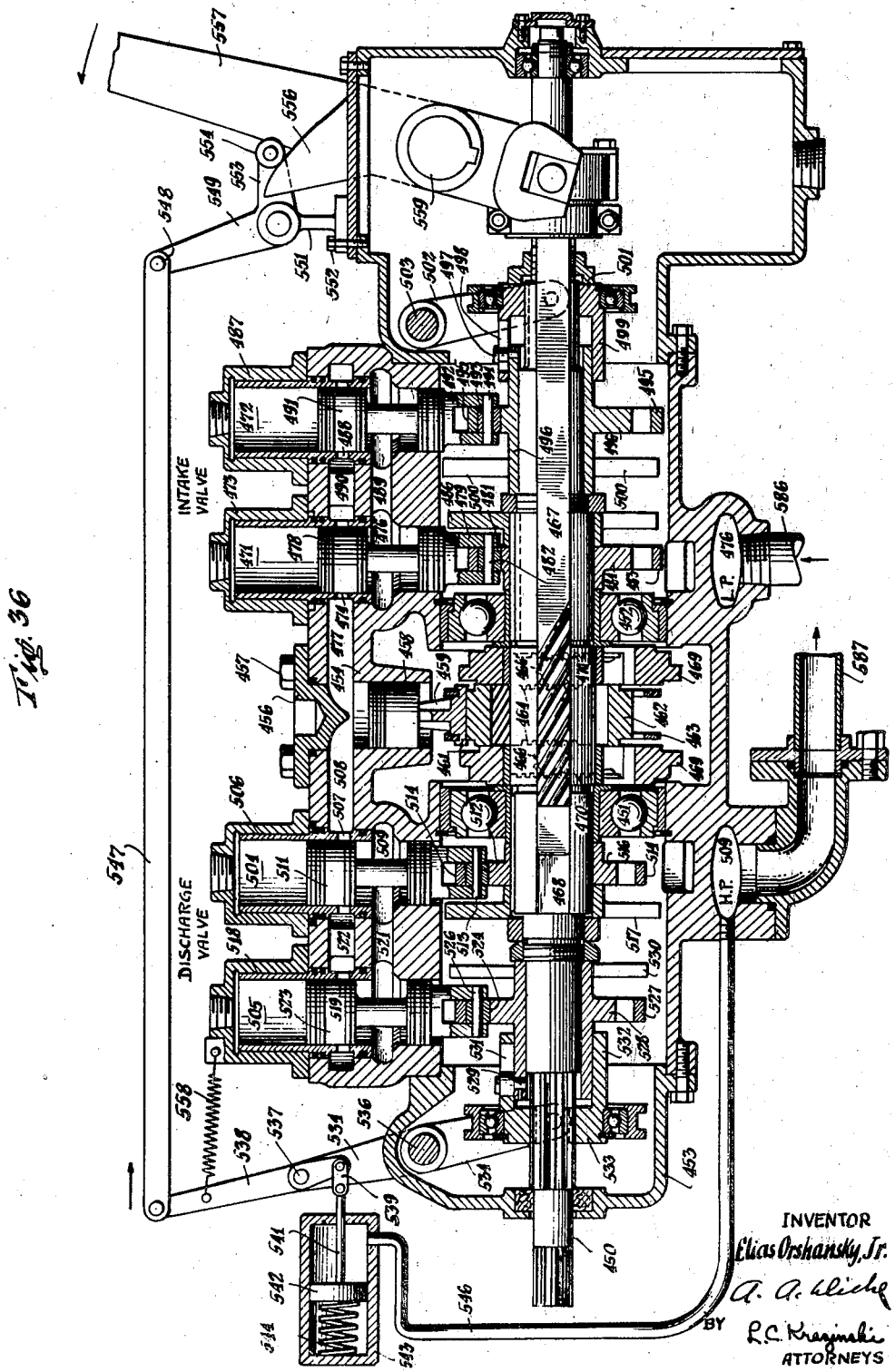
Figure 46:
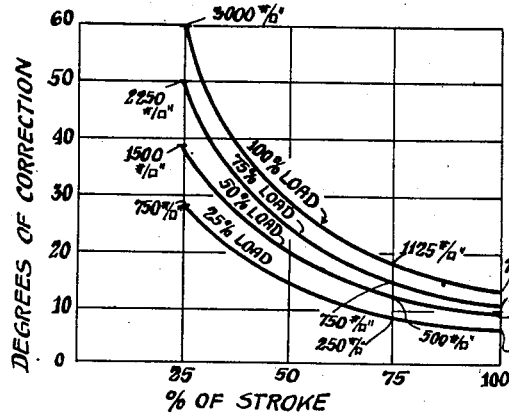
Figure 48:
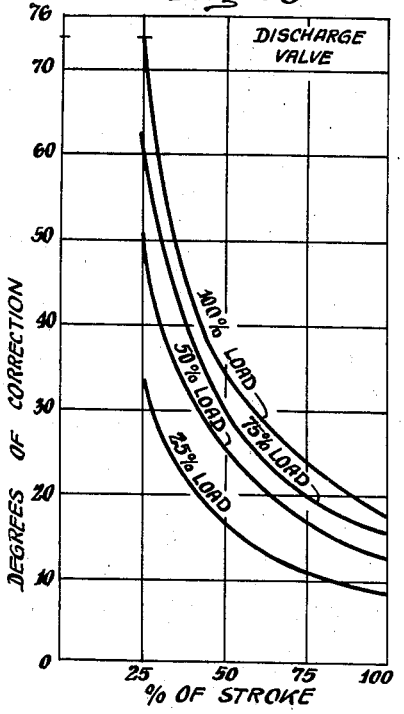
Figure 37:
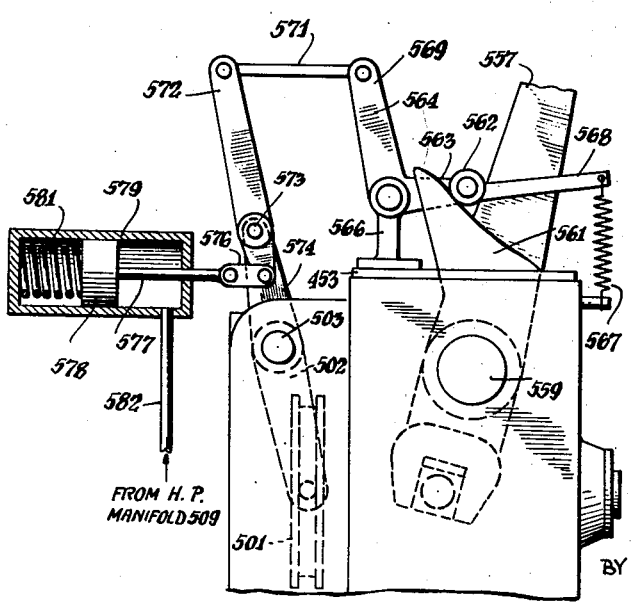
Figure 47:
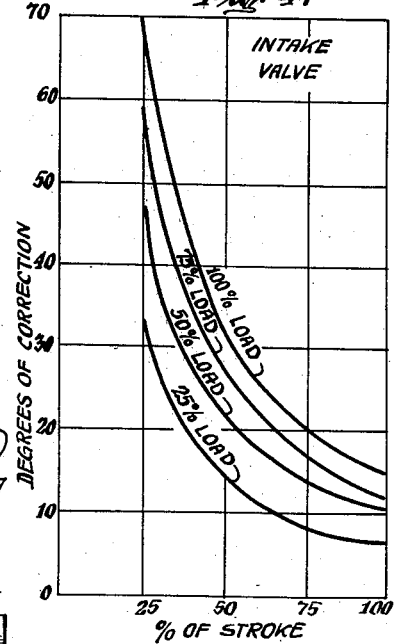

Figs. 17 to 20, inclusive, are diagrammatic transverse sectional views illustrating the valving structure embodied in the transmission of Fig. 15;

Figs. 21 and 22 are schematic views of pump and motor units, respectively, showing eccentrics such as may be wholly or partially employed in a unit of the type shown in Figs. 1A and 1B;

Fig. 23 is a sectional side view of a pump in which the elasticity of the hydraulic system is automatically corrected for by means of a composite double-acting valve which is automatically responsive to change in pressure and length of piston stroke;

Fig. 24 is a transverse sectional view taken along line 24—24 of Fig. 23 illustrating the working pistons and means for varying the piston stroke;

Fig. 25 is a sectional view taken along line 25—25 of Fig. 23 illustrating the fixed valve elements of the composite valve structure;

Fig. 26 is a partial plan view showing an arcuate slot and pin assembly adapted for varying the position of the eccentric associated with the variable valve element of the composite valve structure;

Fig. 27 is a chart showing a series of curves representing the phase displacement between the working piston and the fixed and variable valve elements;

Figs. 28 to 35, inclusive, are diagrammatic representations of the relationship existing between the working piston and associated composite valve structure for different conditions of stroke and power in which the corresponding elasticity corrections are indicated;

Fig. 36 is a view similar to Fig. 23 except that composite single-acting valves are associated with the working piston;

Fig. 37 is a view of the control linkage for the intake composite valve superposed upon a portion of the mechanism shown in Fig. 36;

Figs. 38 to 45, inclusive, are diagrammatic representations of the conditions existing in the pump unit of Fig. 36 for different percentages of load and stroke;

Figs. 46 to 48, inclusive, show curves illustrating the correction required at several percentages of stroke and load; and Fig. 49 is a diagrammatic view of a cylinder head and piston for consideration in connection with the mathematical calculations.

In order to better illustrate the general effect of elasticity of the liquid and associated component parts upon the hydraulic system, the invention will be first analyzed from a mathematical standpoint. From the following equations the elasticity losses that would normally exist in a hydraulic system may be calculated. Furthermore, the optimal valve timing for reducing the elasticity losses to zero may be determined from these equations. It is, of course, understood that the equations can be applied to any high pressure positive displacement pump unit irrespective of mechanical construction.

For the purpose of analysis, friction losses and such leakage losses as may occur have been neglected. It is to be noted that the term "elasticity" applies not only to the liquid employed but also to the component parts associated therewith, such as the cylinders, cylinder heads, pistons, connecting rods, cranks, shafts, etc., and, therefore, the following equations include the effect of elasticity of these elements. Compression of the liquid results in a greater quantity of liquid in the same volume and distortion of the pump parts results in a change of volume. In the following discussion the latter effect will be regarded as though it were caused by compressibility of the liquid and is included in the elasticity of the liquid.

For the sake of simplicity, the low or intake pressure has been considered as at atmospheric pressure. However, the actual intake pressure may instead be considered and accordingly the working pressure P will be the difference in pressure between the high and low pressure passages or manifolds.

Referring to Fig. 49 the following notations apply:

$V_p$ = designed displaced volume of pump cylinder, in cubic inches.

$C_p$ = designed undisplaced volume of pump cylinder assembly, in cubic inches. (Cylinder head and portion of cylinder, depending upon length of piston stroke, are included.)

$V_a = V_p + C_p$ = total designed volume of pump cylinder assembly at atmospheric pressure, in cubic inches.

$E$ = volume change with change of pressure from atmospheric to P, in percent of original volume. (Includes deflection of parts.)

$P$ = given pressure in pounds per square inch.

$V_{p1} = V_a(1-E)$ = total volume of pump at pressure P, in cubic inches.

$A_p$ = area of pump cylinder bore.

$S_p$ = stroke of pump.

$C_a$ = volume at atmospheric pressure in pump (to which oil will expand from volume $C_p$ at working pressure).

$N_p$ = R. P. M. of pump.

*Pump*

The total volume of the pump at pressure P in cubic inches is:

$$V_{p1} = V_a - V_a E$$
$$= V_a(1-E) \qquad (a)$$

The volume displaced by the piston in compressing oil to pressure P (and distorting the pump parts)

$$= E(C_p + V_p) \qquad (1)$$

The volume of oil discharged by the pump cylinder at pressure P $$= V_p - E(C_p + V_p) \qquad (2)$$

*Work of pump*

The work required to compress oil from atmospheric pressure to pressure P $$= E(C_p + V_p)\frac{P}{2}N_p \qquad (3)$$

The work required to discharge oil at pressure P $$= [V_p - E(C_p + V_p)]PN_p \qquad (4)$$

Work done on the pump piston by an external source, assuming no work has been recovered:

$$= \frac{EPN_p}{2}\overset{(3)}{(C_p + V_p)} + PN_p\overset{(4)}{\left[V_p - E(C_p + V_p)\right]} \qquad (5)$$

$$= \left[V_p - \frac{E(C_p + V_p)}{2}\right]PN_p \qquad (5a)$$

The undisplaced volume of oil at the end of the discharge stroke in the pump cylinder assembly at pressure P $$= C_p$$

This volume $C_p$ at pressure P has pent-up (potential) energy and will expand to atmospheric pressure, and may be used to force the pump piston downward. This expanded volume $C_a$ $$= \frac{C_p}{1-E}$$

The volume of oil displaced during work on pump piston from pressure P to atmospheric pressure $$= C_a - C_p = \frac{C_p}{1-E} = C_p \qquad (6)$$

The recoverable work in the pump therefore $$= (C_a - C_p)\frac{PN_p}{2} \qquad (7)$$

Expressed otherwise this equation becomes $$\left(\frac{C_p}{1-E} - C_p\right)\frac{PN_p}{2} = \frac{EC_pPN_p}{2(1-E)} = \frac{PN_p}{2}\left(\frac{EC_p}{1-E}\right) \qquad (8)$$

This recoverable work may be returned to the pump shaft as torque and therefore helps to do work on other units of the pump. For this reason work supplied to the pump by external means $$= \frac{PEN_p}{2}(C_p+V_p)+PN_p[V_p-E(C_p+V_p)]- \quad (5)$$

$$\frac{PN_p}{2}\left(\frac{EC_p}{1-E}\right) = \frac{PN_p(2-E)}{2}\left[V_p - \frac{EC_p}{1-E}\right] \quad (9)$$

This is the input work supplied to the pump by an external source or prime mover.

It has been discovered that the losses that might have been caused by the elasticity of the oil and component parts may be eliminated if the valve timing of the pump inlet valve is modified by opening the inlet valve after the oil which remains in the cylinder head at the end of the discharge stroke is expanded to atmospheric pressure in accordance with the downward motion of the piston from top dead center.

The exact amount by which the valve timing must be changed will be given below in terms of piston travel. This, of course, can be easily translated into degrees of crank rotation, as required.

*Correction for pump*

As stated before, the pump stroke $$= \frac{V_p}{A_p}$$

The volume displaced by the piston as the oil in the cylinder $C_p$ expands to atmospheric pressure $$= C_a - C_p = \frac{C_p}{1-E} - C_p \quad (6)$$

The distance which the piston will cover in displacing this volume is:

$$\frac{\frac{C_p}{1-E} - C_p}{A_p} = \frac{EC_p}{(1-E)A_p} \quad (10)$$

This equation represents the length of pump-piston travel before the low pressure inlet valve should open, the inlet valve then remaining open until bottom dead center. This correction, therefore, is the amount required in the pump valve timing, expressed in terms of piston travel.

If this correction is not applied, there will be a loss of power which can be calculated from the equation below:

$$\frac{PN_pEC_p}{2(1-E)} \quad (8)$$

Equation 8, therefore, represents the loss of energy heretofore resulting from expansion of oil into the low pressure chamber without doing useful work. The loss ratio of the uncorrected pump, on an energy basis, is the above loss of energy (Equation 8) divided by the work done on the piston by an external source (Equation 5).

Percent loss in pump $$= \frac{EC_p}{(1-E)[2V_p - E(C_p+V_p)]} \times 100 \quad (11)$$

The above equations show the conditions of timing and pressure within the cylinders of the pump of a positive hydraulic transmission and set down laws governing correction necessary to eliminate any loss due to elasticity of the working liquid and component parts.

These equations apply to every displacement pump operating on liquid at high pressure, irrespective of their mechanical construction. The method of actuation of plungers, manner of valving and other mechanical details do not cause any possible departure from these equations.

Whether the valving is done by a distributor plate, as in some axial piston pumps, a centrally located shaft or pintle with machined passages, as in some radial plunger units, or mechanically-operated balanced or unbalanced valves, or single or double acting valves, is immaterial. The general law, whatever the valving means, is that the pump inlet valving means must delay communication between the cylinder and the low pressure line until the oil in the cylinder and cylinder head has expanded to the pressure of the low pressure line, (which may be considered as atmospheric pressure).

While the above is believed to be a correct mathematical analysis of the principles underlying applicant's invention, it is to be understood, of course, that the invention is independent of any theory which may be advanced to account for the results obtained.

The losses occurring incident to elasticity were traced hereinbefore. As also indicated previously, these losses are characterized by a loss in volume of pumped oil. Such loss is, of course, a loss in volumetric efficiency. Therefore, it has been a primary problem to study the losses in volumetric efficiency of the pump in order to correct for the same.

It is comparatively easy to check the volumetric efficiency of a positive-displacement hydraulic transmission. Such efficiency is shown directly by the relation of the input to output revolutions per minute, as observed under actual operating conditions, and compared to the values which have been previously calculated. In the course of developments undertaken to build an efficient high-pressure transmission, including the pump, attention was directed to eliminate, as far as possible, leakage of oil, which was formerly considered to be responsible for the entire loss of volumetric efficiency. To achieve this, a transmission was built using a piston-type pump and a motor with positively-sealed balanced valves. These valves proved to be able to hold oil at a pressure of 3500 pounds per square inch when tested statically, with a leakage so minute that a volumetric efficiency of the transmission of at least 98.5% should have been achieved.

As brought out hereinbefore, actual tests showed that the efficiency of the transmission was far below expectations. The loss in efficiency was observed to be due to a loss of speed of the output shaft and in spite of the ability of the valves to hold pressure. A series of tests were conducted to isolate the cause of the loss and it was found that the largest loss was caused by the fact that the elasticity of the oil and pump parts was not taken into account in the design of the transmissions. Subsequently, a method was developed for correcting this condition by proper timing of the valves for the pump and motor of the transmissions. At the present time, as far as applicant is aware, no method for correcting this loss has ever been employed and, in fact, the effect of elasticity in positive-displacement transmissions has never been described. Following these tests, further tests were conducted which have led to these conclusions:

*a*. In a high pressure positive-displacement transmission prohibitive losses result from elasticity of oil and component parts of the transmission.

b. These losses are dependent not only on the displaced volume of oil but also on the clearance (undisplaced) volume within the cylinders and cylinder heads. In other words, if the pump, the motor, or both, are capable of having their displacements varied in order to vary the ratio of drive in a transmission, it is found that the losses vary in accordance with such changes in displacement.

c. These losses can be reduced to substantially zero if proper correction of valve timing is introduced.

d. This correction varies as the relation of displaced and undisplaced volume varies and with the pressure employed.

Reference may be made to Fig. 4 of the drawings in which a chart is shown illustrating the compressibility of oil in comparison with the pressure per square inch of surface. Various tests have been made with oils of different viscosity, in which oils have shown slight departures from the graph presented in this figure. Such departures have been so slight that this graph may be regarded as typical and, as will be apparent, it is almost a straight line within the range of working pressures. From this graph it is apparent that the compressibility by volume is as high as .012 under ordinary working pressures of approximately 3,000 pounds per square inch. (The apparent coefficient will of course be affected by the strength of the pump parts.)

While these values are quite low, particularly in the low pressure range, unfortunately, as I have found, they produce much greater loss in a hydraulic transmission than is immediately apparent. To comprehend this, one should consider the conditions existing in one cylinder during one pumping cycle. For the sake of clarity, concrete values will be used and a pump not arranged for correction of losses caused by elasticity will be discussed. In such pumps as heretofore used the inlet and outlet valves open and close substantially at top dead center and bottom dead center. The oil pressure will be considered as 3,000 pounds per square inch, at which pressure the compressibility is assumed to be 1.2% by volume. The displaced volume of the cylinder will be considered as 6 cubic inches and the volume of the cylinder head as 30 cubic inches. These values represent one actual design.

Attention is now directed to Fig. 8 in which a pump mechanism has been schematically illustrated. When the working piston is at bottom dead center, the values will be closed and both the cylinder and cylinder head will be full of oil at substantially atmospheric pressure. This will illustrate the condition existing at the beginning of the discharge stroke of the pump.

The piston now begins to move upward. In this movement the piston compresses the oil not only in the cylinder but also in the cylinder head. Having in mind that the pressure in the high pressure passage is around 3,000 pounds per square inch, it is obvious that before any oil can be discharged from the cylinder the piston must displace a volume equal to 1.2% of 36 cubic inches or 0.432 cubic inch. (If the discharge valve is opened at this time, oil will surge back from the discharge passage to the cylinder). Since the displacement of the piston is 6 cubic inches, the discharge of oil to the discharge passage during the full piston stroke will be the difference between the volume of the cylinder and the volume displaced by the piston, that is, 6—0.432 or 5.568 cubic inches. As the piston reaches top dead center, the high pressure or discharge valve will close. Consequently, there will remain in the cylinder head 30 cubic inches of oil at 3,000 pounds per square inch.

If the low pressure valve now opens and connects the cylinder head to substantially atmospheric pressure, as shown in Fig. 8, the oil in the cylinder head will rapidly expand and surge back into the low pressure passage. The 30 cubic inches of oil will thereupon expand to $$\frac{30}{1.00-.012}$$

or 30.36 cubic inches. This means that 0.36 cubic inch of oil under pressure will be lost to the low pressure passage without doing useful work. This loss of oil, from the high to the low pressure passage or manifold without useful work, is, of course, identical in its effect to leakage. Until now, it has always been regarded as leakage inevitable in a high pressure transmission. This 0.36 cubic inch of oil is 6.47% of the volume (5.568 cubic inches) of oil discharged by the pump. It, therefore, represents a 6.47% loss in volumetric efficiency.

Figure 5:
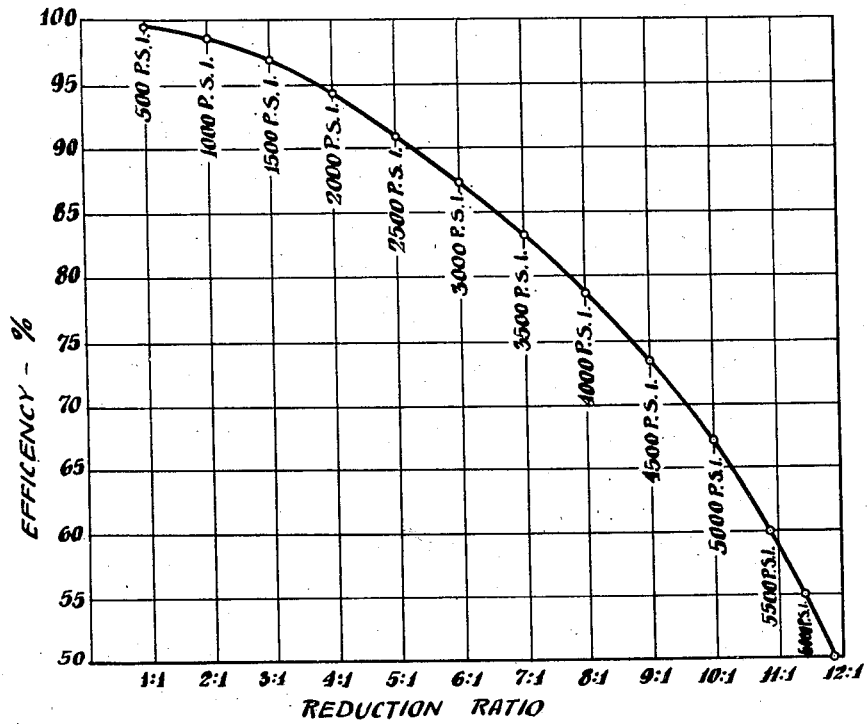
Fig. 5 is a curve illustrating the loss of efficiency of a transmission of the usual design operating at varying ratios of drive as well as at different pressures.

Thus it is seen that, although the elasticity effect is only 1.2% at 3,000 pounds per square inch, it introduces a volumetric efficiency loss of 6.47% in the pump. The loss, however, is considerably aggravated as the length of piston stroke is reduced. This is because the greater the undisplaced volume of the cylinder and cylinder head with respect to the volume displaced by the piston, the greater will be the loss. Stated otherwise, as the volume displaced by the piston of the pump is reduced, the undisplaced volume of the cylinder and cylinder head is increased. In connection with such piston stroke variations, attention is invited to Fig. 5 in which a graph is shown of the performance of a transmission having an invariable motor and a variable-capacity pump. This graph shows a percentage of efficiency under given reduction ratios with different liquid pressures as the pump stroke is reduced. It will be seen from an examination of the curve that when high ratios are present, the efficiency of the mechanism decreases to a point where, under ordinary circumstances, the mechanism may be regarded as too inefficient to be practical.

It will now be assumed that the piston stroke is reduced to one-half of its previous stroke. Under this assumption the piston displacement will be 3 cubic inches and the volume of the cylinder head, 31.5 cubic inches. This is readily apparent for, as the stroke is reduced, the limits of the piston motion move closer and closer to the center of the stroke. If, for instance, the stroke were reduced to zero, the piston would remain stationary halfway between top and bottom dead centers. Under such circumstances the undisplaced cylinder and cylinder head volume would be considered as 33 cubic inches. Of course, if the pump stroke is reduced to one-half of its maximum value, the pump will usually operate at a relatively high pressure. The motor piston stroke will remain as formerly, although its speed of operation will decrease. This will be taken into account in the following example:

At the beginning of the pump discharge stroke, the piston is at bottom dead center with the cylinder and cylinder head full of oil, containing 34.5 cubic inches. 1.2% of this volume or 0.414 cubic inch will be used up by elasticity. Thus, with a piston displacement of 3 cubic inches, of which 0.414 cubic inch is used to compress oil, only 2.586 cubic inches of oil will be discharged into the high pressure passage and thence to the motor or other fluid utilizing device.

Additionally, at the end of the discharge stroke, 31.5 cubic inches will be left in the cylinder and cylinder head at 3,000 pounds per square inch. This will expand to $$\frac{31.5}{.988}$$

or 31.9 cubic inches at atmospheric pressure and, therefore, 0.40 cubic inch will be lost without doing useful work. Since 2.586 cubic inches of oil were discharged, this represents a volumetric loss of $$\frac{0.40}{2.586} \times 100$$

or 15.5%. This loss will, in addition, occur twice as the pump is now performing two strokes to one stroke of the motor.

Thus, the substantial losses that can be caused by elasticity, even with a coefficient of elasticity of only 1.2% may be visualized and it will, moreover, serve to illustrate how these losses increase very rapidly as the stroke decreases.

This accounts for the fact that positive pressure hydraulic transmission systems built heretofore have had such poor performance when either heavy loads were applied to them (thus producing high pressure) or when a high reduction ratio was required under load.

A solution of the problem is not to be found in reducing the size of the cylinder head space as the losses will still mount rapidly as soon as any variation in stroke is attempted. As mentioned hereinbefore, part of the cylinder volume becomes in effect head volume as soon as the piston stroke is reduced. In fact, commercially available positive-displacement transmissions have an efficiency curve which, at some reduction ratio with high load (pressure), reaches zero.

For the first time—insofar as it is known—an explanation is offered for this and a method of eliminating this loss is described below. I have found that to correct losses due to elasticity it is necessary to modify the timing of opening and closing of high and low pressure valves in such a manner as to prevent the escape of high pressure oil into the low pressure passage without doing useful work. This is accomplished in the pump mechanism in the following manner, attention being had to Fig. 9:

Assuming that the piston in this pump assembly is at the bottom of the stroke with the cylinder and head full of oil at atmospheric pressure, it will be understood that, as the piston starts upward, the high pressure discharge valve is opened and the piston discharges oil into the high pressure passage. The piston now reaches top dead center and the high pressure valve closes. At this point, the head is full of compressed oil at high working pressure. If the low pressure inlet valve were now to be opened—in accordance with conventional practice and as shown in Fig. 8—the oil would expand and escape into the low pressure passage, thus causing volumetric losses as aforenoted. Instead of doing this, however, I have found it preferable to delay, at top dead center of the piston, the opening of the low pressure valve following closure of the high pressure valve. The period of delay varies with the piston stroke length and pressure, being of sufficient extent to allow the piston to travel downwardly until the compressed oil in the head expands to inlet pressure, the energy released by expansion of the oil being returned to the pump piston. When the oil has expanded to the inlet pressure, the low pressure valve opens and remains open until the piston reaches bottom dead center at which point the low pressure valve closes. While, of course, the high pressure valve may thereupon remain closed until the pressure in the cylinder has been built up to a point where it equals substantially the pressure in the high pressure manifold, I have found that it is convenient in some instances to open the high pressure valve immediately the piston moves past bottom dead center. The above cycle of operation is then repeated.

Accordingly, in Fig. 9, showing the corrected pump assembly, the following operation occurs:

a. The piston may be considered initially at bottom dead center with both the inlet and outlet valves closed.

b. The piston starts upward on the compression stroke and the high pressure outlet valve (in the form shown) opens immediately after bottom dead center.

c. The piston reaches top dead center and the high pressure or discharge valve closes.

d. The piston starts its downward or intake movement and both the high pressure as well as the low pressure valves remain closed (as shown in Fig. 9).

e. The piston reaches a certain point in its downward stroke at which the oil in the head has expanded to inlet pressure and the parts of the mechanism have returned to normal (unrestrained) condition as the pressure has dropped. At this point, the intake or low pressure valve opens and oil will then enter the cylinder. Finally, the piston reaches bottom dead center, at which point the low pressure valve closes.

From the foregoing, it is obvious that to correct for the "elasticity" losses, the valve timing must be so varied in the pump that the compressed oil in the cylinder and the cylinder head is not allowed to communicate with oil in the low pressure manifold until it has expanded to the pressure of the low pressure passage or manifolds. In so expanding, the liquid performs useful work on the pistons. It will incidentally be understood that, if desired, communication between the high pressure manifolds and the cylinders may be interrupted until the pressure of liquid in the cylinders is substantially equal to that in the discharge passage.

Figure 6:
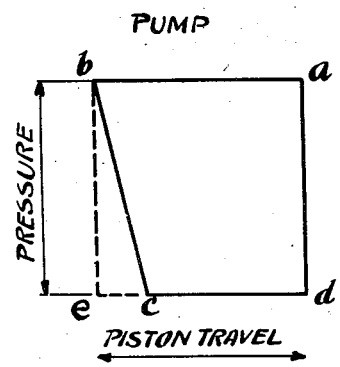
Fig. 6 is a diagram illustrating the correction that might be employed and factors which should be taken into account incident to the elasticity of the liquid and component parts resulting from the high pressures developed in the pump.
Figure 7:
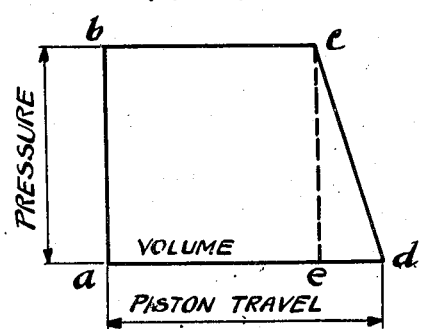
Fig. 7 is a view similar to Fig. 6, but showing the factors involved in connection with the motor of the transmission.

To express the foregoing in terms of piston motion and pressure, attention is directed to Figs. 6 and 7. In the former diagram, the conditions in the pump are taken into account while in the latter the conditions in the motor are visualized. However, in this application the relation of piston motion and pressure will be described with particular reference to the pump. Accordingly, in Fig. 6 it will be observed that the diagram indicates the pressures existent in the pump and the piston travel in a cylinder thereof. The line (d) to (a) indicates the rise in pressure as the outlet or high pressure valve opens. Thus points (a) and (d) are equivalent to the beginning of the discharge stroke with the high pressure valve open. From point (a) to point (b) there is visualized the discharge from the cylinder. Point (b) may, therefore, be regarded as symbolizing the end of the discharge stroke at which point the outlet valve closes. At point (c) the inlet valve opens. Thus the lines drawn from points (b) and (e) to point (c) represent the portion of the piston stroke during which the oil expands to the inlet pressure, which may be considered as substantially atmospheric pressure. From point (c) to point (d), of course, intake of oil into the cylinder occurs.

Therefore, the area (a), (b), (e), (d) represents work done on the oil by the piston. On the other hand, area (b), (e), (c) represents the work done by the oil on the piston. This is the recovered work (energy) due to change in the valve timing. This work is lost with conventional timing and represents a loss in efficiency.

With the foregoing in mind, attention is now invited to Figs. 2 and 3. In the first of these views, the member 65 controlling the low pressure valve of the pump has been illustrated. It will be seen that the dwell portion has been extended substantially 20° into the actuating portion and beyond the point at which it would terminate in a conventional member. It will be understood that the unit illustrated in this view is rotating in a counter-clockwise direction. As a consequence and as indicated at 94', the center of the lobe will, with this proportion of the parts, be displaced substantially 10° from its normal position. If this proportion of the parts is adhered to, it is obvious that the low pressure valves of the pump unit will not open until a portion of the intake stroke of the pistons has been completed. In this manner, the energy will be translated into driving force throughout this portion of the stroke, in view of the fact that the oil in expanding performs useful work.

Likewise, in Fig. 3 in which the member has been indicated as rotating in a clockwise direction, it will be seen that, while the dwell portion terminates adjacent the usual point, the actuating portion terminates approximately 26° short of the point at which it would end in a conventional unit of this type. Thus, in the high pressure or power stroke of the motor, the intake valves will close an interval before the pistons have completed the stroke. In this fashion, the energy is again fully utilized in that the expansive tendency of the oil and parts continues to drive the pistons after the inlet valves of the motor have closed. As indicated in this view, the center of the cam portion, indicated at 95', is displaced approximately 13°. The foregoing proportions are, of course, explanatory of the design illustrated in Figs. 2 and 3. Obviously, the figures might be varied, not alone according to the designs involved, but also according to the pressures which are to be employed, the stroke of the pistons, etc.

Attention is now directed to Figs. 1A and 1B in which a transmission is illustrated wherein loss caused by "elasticity" of the system is substantially eliminated. In the form of the mechanism thus shown it will be noted that no mechanical connection exists between the driving and driven shafts. Consequently, the power is transmitted to the driven shaft or member wholly by liquid under pressure. Likewise, while, as shown, the transmission may preferably include a unitary casing portion, it will be appreciated that the pump and motor units of the transmission might be spaced any desirable distance and connected by pipes, if such a form of installation were preferred or necessary.

Thus, referring primarily to Fig. 1A, it will be seen that the reference numeral 25 indicates the driving member which may be a part of the engine and to which a starter ring or starter plate 26 in the form of a flywheel may be secured. Also coupled to the driving member is a shaft 98' which extends within a housing 99, to which may be secured the heads of cylinders 100. Reciprocating within each of the latter are pistons 101 actuated by an eccentric or crank portion 102. The eccentricity of such portion may be varied and counterbalances 103 may be associated with this part of the mechanism in order to dynamically balance the shaft. The means for varying the eccentricity and counterbalances is not covered in detail herein, inasmuch as the manner of doing so is well known, one embodiment of which is shown in my prior Patent 2,256,324, issued September 16, 1941.

Associated with each of the cylinders is a valve 106, as well as a valve 107. The former series of valves is actuated by an eccentric 104 secured to shaft 98', while the latter series of valves is similarly actuated by an eccentric 105. Valves 106 control the flow of liquid from the low pressure manifold 108 into the cylinder, while the valves 107 control the flow of high pressure liquid from such cylinders into manifold 109. Conveniently secured to shaft 98' in advance of the eccentric or crank 102 is a gear 110'. This gear, through the instrumentality of a gear 111', serves to drive pumps 112' and 167. The latter is preferably of the gear type and serves to lubricate the bearings of the unit, to cause a functioning of the controls of the transmission and to prime the elements of such transmission.

Now referring to Fig. 1B, it will be seen that there has been primarily illustrated in this view the motor portion of the transmission. Such portion includes a rotatable shaft 110 upon which a crank 111 is mounted. This crank, which is similar to crank 102, is preferably in the form of an eccentric and is also adjustable in order that its throw may be varied. Accordingly, the stroke of the piston rods 112 and pistons 113 connected therewith may be varied. The pistons—which preferably comprise a series corresponding to the series of cylinder assemblies in the pump—reciprocate within cylinders 114. Extending from the heads which form a part of the cylinders are passages, the flow of liquid through which is controlled by valves 115 and 116. These valves are respectively actuated by members 117 and 118 secured to shaft 110. The liquid in its flow from or towards these valves, passes through manifolds 119 and 120. The former is connected to manifold 109 under normal conditions of forward drive of the transmission and manifold 120 is similarly connected to manifold 108. The details of such connecting structure will be hereinafter brought out.

Also similar to the construction embraced in Fig. 1A, counterbalancing members 121 are associated with the shaft 110. These counterbalances serve to dynamically balance the action of the eccentric or crank 111. In other words, the greater the distance the center of such eccentric or crank extends from the center or axis of shaft 110, the greater will be the extension of the counterbalances in an opposite direction.

In order to shift the eccentric and crank portions, actuating slides 122 are employed. These may be shifted longitudinally of the shaft 110 by means of a collar connection 123. A pair of pivoted levers 124 are secured to this collar member and have their opposite ends connected to a rod 125. Also connected to such rod is a piston 126 which moves within a cylinder 127, liquid under pressure being preferably supplied to that cylinder by means of the pump 112'.

Figure 14:
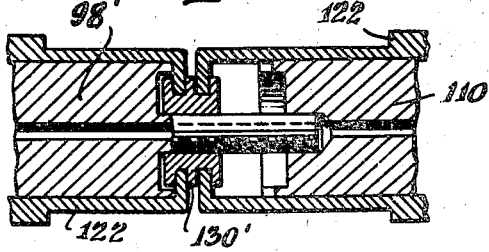
Fig. 14 is a fragmentary longitudinal sectional view showing the coupling structure employed in the transmission of Figs. 1A and 1B.

The manner in which the lever 124 is secured to the collar 123 and in which collar 123 is in turn coupled to the slide 122 is clearly illustrated in Fig. 13. The connection between the slides 122 of the motor unit and the slides of the pump unit (Fig. 1A) is particularly brought out in Fig. 14. In this view, it will be noted that a coupling element 130' is employed to connect these elements to have synchronized movements longitudinally of the shafts or members 98' and 110, and, at the same time, allow the driving and driven elements to rotate at different speeds or, in fact, in directions reversed with respect to each other.

A tachometer connection 128 may be provided to be driven by a gear 129 in order that the revolutions per minute of the shaft 110 may be determined. There is also affixed to the shaft 110 a unit 130 which may provide a braking surface such that a retarding and parking mechanism may be associated with the transmission. In the illustrated form of the transmission described up to this point, it will be noted that the details of the connection or connections, which may be provided between the driven end or the member of the transmission and the mechanism to be coupled thereto, have not been shown. Obviously, this is of no particular consequence and such connection will be established in any manner best calculated to suit any given installation.

Finally, with reference to the structure of the transmission as shown in Figs. 1A and 1B, it will be understood that the valve operating members 105 and 118 will follow generally conventional and accepted construction. On the other hand, members 104 and 117 will have a correction of the type generally indicated in Figs. 2 and 3, and as will be particularly hereinafter described in connection with Figs. 21 and 23. As a consequence of this, the pump, as illustrated in Fig. 1A, will be driven also by the expansive force incorporated in the liquid during the initial stages of the low pressure or suction strokes of the piston, while the motor will be disconnected throughout the latter portion of the high pressure or working stroke of its pistons in order to take advantage of the energy present in the liquid and mechanism.

As will be understood, the correction for elasticity, when eccentrics are employed and sliding spool valves are used—as in Figs 1A and 1B—is slightly different from the correction employed in Figs. 2 and 3. In connection with such correction, attention is next invited to Fig. 21, in which is shown schematically eccentrics and sliding spool valves that correspond to valves 106 and 107 in Fig. 1A. The numbering of this figure for the purpose of this description will be correlated to Fig. 1A. Valve 106 is the low pressure valve of the pump and connects the cylinder within which piston 101 operates with the low pressure passage 108. Valve 107 connects the cylinder with the high pressure passage 109. The valves are respectively actuated by eccentrics 104 and 105. Note that the restraining rings identified as (a) in all of these figures serve to retract the valves and pistons. The elasticity correction consists in delaying the opening of valve 106 until after piston 101 has travelled downward from its top dead center position an amount equivalent to 20° of its crank travel. For that reason, the center of the eccentric 104 is offset 10° late with respect to its position without elasticity correction, so that it follows the piston eccentric 102 by 100° instead of by 90°. The port identified as (g) is so disposed that in travelling upward the lower edge of the valve will clear this port and open the cylinder to the low pressure chamber 108 after the eccentric 102 has travelled 20°. The center of the valve eccentric 104, point (c), will at that time travel 20° upward to a position (c') at which point valve 106 will open. The valve will remain open until eccentric 102 reaches bottom dead center position, at which point the valve will interrupt the communication between the cylinder and the low pressure passage. It is to be noted that, if a 20° correction is required, the center of the eccentric is offset 10° in order to assure that, although the opening point of the valve is 20° late, its closing point is at bottom dead center. The combination of the angle of offset of the eccentric and the position of port (g) enables the designer to select any period of opening desired. This is a matter of ordinary geometry.

Valve 107 does not require any correction. For that reason, the center of the eccentric 105 leads the piston eccentric 102 by an even 90°. Also, port (d) is so disposed that opening occurs at bottom dead center and closing at top dead center.

In the motor, Fig. 22, which corresponds to Fig. 1B, the valve 115 connects the cylinder within which piston 113 reciprocates with the high pressure manifold 119 and the valve 116 connects the cylinder with the low pressure manifold 120. Since no correction for the motor is necessary in the low pressure valve, its eccentric 118 is set at 90° with respect to the motor eccentric 111 and the valve opens at bottom dead center and closes at top dead center. The correction is required, however, in valve 115, which is the high pressure valve. To achieve correction, which amounts to closing the valve approximately 26° before piston 113 reaches its bottom dead center, the center of its eccentric 117 is offset 13° ahead of the position which it would occupy without compensating for elasticity (this would be 90° with respect to eccentric 111), and the port (f) is so located that valve 115 in travelling downward cuts off the point (f) 26° before the eccentric 111 reaches its bottom dead center. Because of the location of point (f) and the 13° lead in the eccentric, the opening of this valve coincides with the top dead center position of piston 113. This elasticity correction is shown for illustration only. Any correction can be assumed by offsetting the valve eccentric ahead or retarded half the number of degrees of the piston travel for a desired correction and the port leading from the piston to the valve should be so located that the opening or closing occurs at a dead center. This again is a matter of ordinary geometry and I believe presents no problem to an experienced designer.

It will be noted that different types of valves have been illustrated for controlling the flow of liquid to and from the cylinders. More particularly in Figs. 1A and 1B, it will be noted that valve 106 is of the spool type and that the pusher rods have their contacting portions maintained in proper relationship with respect to the member 104 throughout the operating cycle. On the other hand, valve 107 is of the type which embodies a line-seal and a spring return which constantly maintains its actuating element or pusher rod in proper relationship with respect to the cam 105. Valve 115, as shown, is again of the spool type and in common with valve 106 employs a pivotally-coupled connecting rod operatively coupled with a cam 117. Valve 116 is of the type in which a line-seal is present and a double-throw cam with a proper cooperating type of connecting rod is employed. It is obvious that these various types of valves have been shown primarily to exemplify the several structures which at present are found to be suitable for association with a transmission of this type. As will be obvious, it would be preferable and is intended that under actual production methods valves of a single type will be employed. These valves might obviously take numerous different forms in addition to those illustrated so long as they are to be regarded as, in effect, leakproof even in the presence of the excessive pressures which are encountered in the present transmission. However, these valves should preferably be of the balanced type so that it is not necessary to utilize large amounts of power in order to unseat the same and as would otherwise be the case if they were operating against a head of pressure.

Returning to a consideration of the transmission shown in Figs. 1A and 1B, and regardless whether the motor is positioned immediately adjacent or remotely disposed with reference to the pump unit of this transmission, it will be understood that with the shaft 25 rotating the pump 112' will be correspondingly driven. The same will be true of the pump assembly generally identified and illustrated in connection with reference numerals 99 to 109, inclusive.

Under the foregoing circumstances, it is apparent that liquid will be flowing towards the cylinders 100 and the heads thereof from the manifold 108 and past the valves 106. Liquid under high pressure will be flowing past valve 107 to the manifold 109. The latter being connected to the manifold 119, it is apparent that the rotation of shaft 98' will result in the motor being driven which will, in turn, cause a rotation of shaft 110. Again in connection with the latter, it will be remembered that the eccentric 111 may be adjusted to vary the stroke of the motor. Accordingly, with eccentric 102 adjusted to effect maximum displacement of liquid from the cylinder 100 and with the stroke of eccentric 111 adjusted to provide for minimum stroke on the part of pistons 113, it is apparent that the speed of rotation of shaft 110 will be greater than that of shaft 98'.

Conversely, with the stroke of pistons 113 being amplified while the stroke of pistons 101 is diminished, a condition will be presented where both shafts 98' and 110 may rotate at the same speed. If further adjustment along these lines is resorted to, a condition will be presented where shaft 110 will rotate at only a fraction of the speed of shaft 98'. While, of course, the eccentrics might be susceptible to adjustment to a point at which they would be almost concentric with respect to the shaft, I have found, because of the aforedescribed effect of elasticity, that it is unwise to diminish the piston stroke of either the pump or the motor beyond a predetermined minimum. If this is not done, and as pointed out previously, a condition will be presented where no driving force is transmitted but instead the liquid within the system is simply subject to compressive impulses and effects, but as a result of which the flow is not adequate to cause the motor to be operated. With the foregoing in mind, I have found that the most desirable range of adjustment of the piston stroke is from a maximum of a certain value down to, for example, one-third of that maximum.

If such proportioning of the parts is resorted to, it is obvious that the variation in ratio between the driving and the driven shafts may be quite large. In other words, under one condition the shaft or driving member 25 may be rotating one hundred times during a given interval. The crank 102 will be similarly rotating and with the pistons 101 having a maximum path of travel, it is apparent that a certain volume of flow through the manifold will result. If, now, the eccentric 111 has been adjusted to a point at which the pistons 113 will have minimum strokes, it is obvious (and aside from the possibility of unavoidable losses) that the eccentric 111 and the driven shaft 110 will perform three revolutions for each one of the revolutions of shaft 25, that is, three hundred revolutions.

It will, moreover, be obvious that as the eccentrics 102 and 111 are adjusted by operation of the rod 125 and control lever 124, respectively, to positions at which substantially equal eccentrically of these cranks occurs, the driving and driven shafts will be synchronized. Further adjustment of the eccentrics in this direction will result in the throw or travel of the pistons 113 exceeding the range of movement of the pistons 101. Under these circumstances, it is, of course, apparent that shaft 110 will be rotating at a slower speed than shaft 98'. Continued adjustment to the permissible extremes will eventually cause pistons 101 to only have one-third of their former travel whereas pistons 113 will be travelling through a range three times as great as pistons 101, assuming that the bores of the cylinders are equal. Under these circumstances, for each revolution of shafts or members 25 and 98', shaft 110 may only have one-third of a revolution.

With respect to the operation of pistons 126 and the crank-adjusting mechanisms associated therewith, it is to be understood that the pump 112', which preferably supplies the liquid under pressure for effecting the control of piston 126, is constantly operating at a speed corresponding to that of the driving members and quite irrespective of any adjustment of the crank portions. However, since the control mechanism, shown in Figs. 1A and 1B, is well-known, further description thereof is not essential for an understanding of the present invention.

It is of course understood that both or either one of the units of the transmission shown in Figs. 1A and 1B may be of variable internal capacity. Obviously, if the reduction range which is required on the part of the transmission is narrow, such as, for example, with the driving shaft operating at constant speed, the driven shaft will operate from a one-to-one to a three-to-one ratio, then only one of the units need be of variable capacity. On the other hand, if the required range of speed variation is, for example, up to ten-to-one, then it is desirable that both units of the transmission be variable. This is because the smaller the stroke the greater must be the correction for elasticity. As is apparent, if it were desired to reduce, for example, the motor stroke to zero in order to lock the pump against rotation, then no correction could be effectively applied. For this reason, any transmission embodying the present teachings should avoid varying the stroke of either the motor or the pump to too great an extent. Therefore, it is generally preferred that both units be susceptible to variation in order to achieve a wide ratio rather than depending upon variation of merely one of said units to achieve this result.

The invention may be embodied in transmissions in which a liquid connection is interposed between the driving and driven shafts—as illustrated in Figs. 1A and 1B—as well as in transmissions in which a gearing connection is interposed therebetween. In the form shown in Figs. 1A and 1B the transmisison comprises pump and motor units embracing radially disposed cylinders. However, the present teachings may be applied to transmissions of the liquid type in which virtually any desired design of pump and motor unit is utilized. These units may be of the well-known axial-piston type, radial-piston pintle type, or other known or suitable type.

Figure 12:
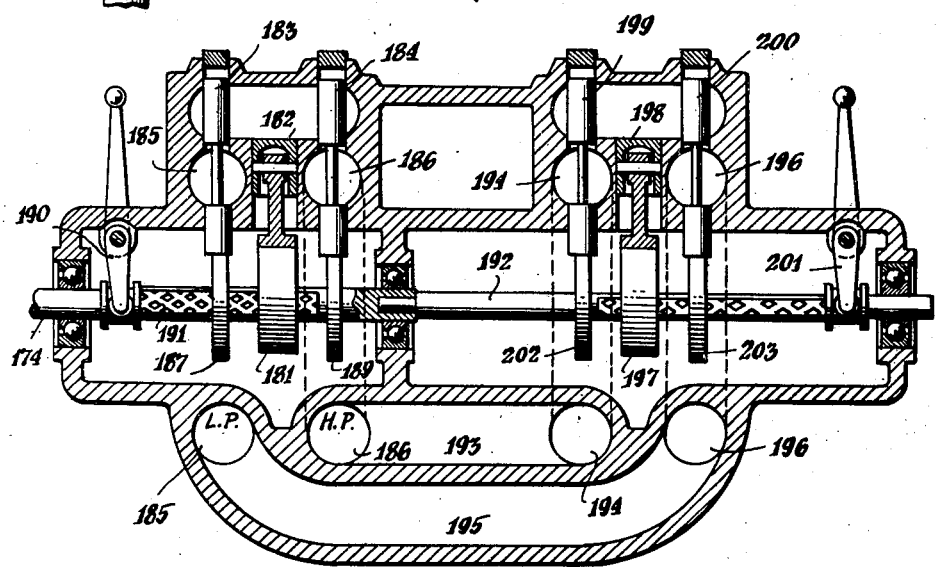
Fig. 12 is a diagrammatic representation of a transmission similar to that shown in Figs. 1A and 1B, the pump and motor cylinder assemblies of which may be regarded as those shown in Figs. 8 to 11, inclusive.

Thus, referring primarily to Fig. 12 in which a unit of the mechanically-operated valve type has been shown, it will be seen that the pump unit and its driving shaft 174 transmit power to the driven shaft 192 solely through the subjecting of liquid to pressure and transmitting driving force to the motor while the liquid is under such pressure, as in Figs. 1A and 1B. Shaft 174 supports an eccentric or crank portion 181 with which the connecting rods of pistons 182 cooperate. Valves 183 and 184 respectively control the flow from the low pressure manifold 185 into the cylinder and from the latter into the high pressure manifold 186. These valves are respectively actuated by cams 187 and 189.

As illustrated, the stroke of the pistons 182 is varied by means of a connection 190 which may be manually controlled or power-driven and which is coupled to sliding key 191 cooperating with the eccentric or crank 181 in the manner heretofore described. Manifolds 185 and 186 are connected to passages 193 and 195 which, in turn, communicate with manifolds 194 and 196, respectively, of the motor unit.

Similarly, the motor includes a crank portion in the form of an eccentric 197 mounted upon shaft 192, the inner end of which is freely rotatable, as shown, within driving shaft 174. This crank is rotated by pistons 198 operating within the cylinders, the flow of liquid into and from which is controlled by valves 199 and 200. These valves are operated by eccentrics 202 and 203, as shown. Stroke variation of the pistons 198 may be effected by a control 201, which is similar to the control 190 for the pump. Both the valve-operating members or cams 189 and 203 may be of conventional design. However, cams 187 and 202 are modified generally in accordance with the teachings of Figs. 2 and 3.

With respect to the pump inlet or low pressure valve 183 and the motor high pressure or inlet valve 199, correction of operation is resorted to. In other words, cam 187 will be generated in a manner such that the valve controlled by the same will be open after the pistons have passed top dead center. Under ordinary conditions, this opening may be deferred to a point 20° beyond such center position. Consequently, the liquid remaining within the cylinder head in a state of compression will assist in operating the pump throughout a portion of its next stroke until the liquid within the cylinder reaches a point where it has substantially atmospheric pressure. The cam 187 will, moreover, cause valves 183 to close as the pistons of the cylinders with which they are associated reach bottom dead center positions. Cams 189 will, of course, function to open the valves 184 at bottom dead center and to close them at top dead center. Valves 199 will be operated by cam 202 so that they open at substantially top dead center but close prior to pistons 198 reaching bottom dead center. As a general statement, it might be said that these valves will be permitted to close approximately 26° before the bottom dead center position is reached by the pistons 198. Consequently, the expansive force of the liquid within these cylinders of the motor will be permitted to act and the losses will be minimized. Cam 203 will simply open valves 200 at bottom dead center position of the pistons and close them at top dead center positions thereof.

Now referring to Fig. 15 it will be seen that there has been illustrated a transmission of the radial-piston pintle type in which the driving and driven members are coupled entirely by means of pump and motor units embraced within the transmission. Thus, in this view the reference numeral 258 indicates the driving member and reference numeral 259 indicates the driven member. Fixedly coupled to the driving member 258 is a block 236, which is formed with radial cylinder bores within each of which is located a radially extending piston 237 and from which cylinder bores extend passages 238. The outer ends of the pistons 237 contact the inner face of a cage 240 and a guiding flange or structure 239 may be interposed between the outer ends of the pistons and form a part of the cage.

In turn, encircling the cage is what is termed a box 241, the position of which in the housing 244 may be adjusted by a control 242 operating, for example, against a spring 243 (also see Fig. 16). As will be observed in Fig. 15, a pintle member 245 extends from the housing 244 and is fixed with respect to the same. This member is formed with passages 248 which communicate at one end with valving recesses 261 and 262 and at their other ends with manifolds 246 and 247, forming a part of the housing 244. Additionally, it is to be noted that anti-friction bearings are conveniently provided to allow rotation of the driving member 258 with respect to housing 244 and also to allow rotation of the cage 240 with reference to the enclosing member or box 241.

The motor structure substantially duplicates the pump structure which has just been described and these units are connected by means of tubes or similar passage-defining structures 250 and 251. These connect to the manifolds of the pump and motor blocks 244 and 252, respectively. Also similarly to the pump, a pintle member 253 corresponding to the pump member 245 is embodied in the motor and the cage, box or housing, blocks and cylinder and piston structures are also duplicated in the motor. The motor block structure serves to drive the driven member 259. Additionally, as will be noted, a control 254 is associated with the motor, which may be employed to adjust the eccentricity of the cage with reference to the cylinder block.

Referring to Fig. 16, pairs of springs 243 are preferably employed for biasing box 241 and for this purpose a support portion or shelf 260 may form a part of the box or housing member 241. Box 241, as viewed in Fig. 15, may be adjusted upwardly and downwardly. Such movement occurs in a definite plane, with respect to the pintle passages.

Now, as will be understood by those skilled in the art, the pintle members 245 and 253, in accordance with conventional construction, would be formed with arcuate grooves or passages 261 and 262, as shown in Fig. 17, and passages 265 and 266, as shown in Fig. 19. These passages form parts of the pintle members 245 and 253 and will communicate with the passages 238 coupling adjacent cylinders as the block formed with said cylinders rotates with respect to the pintle members. Generally the passages 261, 262, 265, and 266 would extend as nearly throughout 180° as might be possible, so that the cylinders would be coupled through the passages 248 (Fig. 15) with the manifolds 246 and 247 throughout the entire effective strokes of the pistons. It may be assumed that the passage 250 is a high pressure passage and passage 251 a low pressure passage or manifold and, moreover, it may be assumed that the groove 261 communicates with passage 250, through manifold 247 and passages 248 while the manifold 246 would couple with the groove or passage 262. Under such circumstances, the pump pistons would connect with passage 261 throughout the entire pressure stroke and with passage 262 throughout the entire intake or suction stroke. Conversely, assuming that passage 266 is connected with the high pressure manifold 250 while passage 265 is connected with the low pressure manifold 251, it will be understood that the pump pistons would operate similarly. Under these circumstanes, no allowance would be made for elasticity of the liquid within the transmission.

However, and according to the teachings of the present invention, with the parts rotating in the direction of the arrows as indicated in Figs. 17 and 18, it will be seen that passage 264 corresponding to passage 262 does not begin until a point is reached which is substantially 20° displaced with reference to the beginning of passage 262 in Fig. 17. On the other hand, passage 263 extends throughout substantially the same area as passage 261. Consequently, on the high pressure stroke of the pump piston the same operation of the parts occurs. However, intake to the cylinders of the pump is not permitted according to the construction in Fig. 18 until after the pistons have moved through an appreciable portion of the intake stroke of the pump. Consequently, the expansible force of the liquid is utilized to drive the pump through this part of its operating cycle.

Referring to the motor and especially comparing Fig. 20 with Fig. 19, it will be seen that passage 267 corresponds substantially to passage 265. Consequently, on the low pressure or exhaust stroke of the pistons of the motor, liquid will flow in the usual manner in both instances. However, it will also be observed that passage 268 terminates at a point substantially 26° short of the point of termination of passage 266. It therefore follows that, on the power stroke of the motor pistons, the cylinders are disconnected from the high pressure manifold 250 prior to the completion of such stroke. Therefore, again the elasticity of the liquid is taken advantage of in that the expansive force of the liquid is employed to drive the motor throughout part of its cycle.

Thus, the operation of a transmission of the pintle type and the correction which is made in order to take advantage of the present invention corresponds substantially to the teachings resorted to in Figs. 8 to 11, inclusive. Obviously, the present examples might be continued indefinitely but it is believed that a sufficient number of illustrations of different types of transmission and descriptions pertaining to the same and particularly explaining the application of the present invention to such transmissions has been made to enable those skilled in the art to fully visualize the invention.

The embodiments heretofore described have been, in the main, concerned with fixed elasticity correction, that is, the pump intake valve has been timed to open a predetermined interval after the working piston has passed top dead center, and once this valve timing has been established it is so maintained despite changes in length of piston stroke and/or pressure in the high pressure line. The embodiments hereafter to be described will be concerned primarily with a variable elasticity correction, that is, the valve mechanism is timed to open and close in accordance with the length of piston stroke and/or pressure of the high pressure line.

Referring now to Figs. 23, 24, 25, and 26, particularly Fig. 23, there is shown a variable stroke pump unit suitable for any use, including use as part of a hydraulic transmission, comprising a driving shaft 300, which may be coupled to any suitable source of power, such as an engine (not shown) and which is supported upon anti-friction bearings 301, 302, and 303 mounted within a housing or casing 304 of the unit. Bearing rings 306 of suitable size and shape are interposed between the several anti-friction bearings 301, 302, 303, and the shaft 300. Within the housing 304 are disposed a plurality of cylinders 307, preferably of the radial type, having cylinder heads 308 threadedly secured thereto and working pistons 309 reciprocatingly slidable therein.

Pistons 309 (see Fig. 24) are connected by suitable connecting rods 311 to slippers 312, which are retained in contacting engagement with an annular eccentric or crank 313 by retaining rings 314. Eccentric 313 is preferably supported upon anti-frictional rollers 316, which have bearing engagement with an inner annular eccentric 317 concentric with eccentric 313. For a detailed description of the double anti-friction eccentric arrangement, reference may be had to my application Serial Number 566,103, filed December 1, 1944 now abandoned.

For varying the length of piston stroke a pair of arcuate segmental racks 318 is disposed within the inner eccentric 317 and secured thereto in any suitable manner, such as by a pair of plates 319 disposed in aligned slots 321 formed in the inner eccentric 317 and racks 318 and suitably secured to the racks 318 by screws 322. The teeth of the segmental racks are adapted for engagement with similar teeth of keys 323, which are disposed in keyways 324 formed on opposite sides of the shaft 300. To obtain additional leverage between the segmental racks 319 and the shaft 300 during adjustment of the piston stroke, the shaft at this point is provided with a flat shoulder 326. For dynamically balancing the forces exerted upon the shaft, the usual variable counterweights 327 (Fig. 23) are disposed as shown. A mechanism for similarly varying piston stroke and associated counterweights is described in detail in my prior Patent 2,256,324 of September 16, 1941. Briefly, however, the variation in stroke of piston 309 is obtained by varying the longitudinal position of keys 323, which, by virtue of their engagement with segmental racks 318, vary the eccentric either upwardly or downwardly, as viewed in Fig. 23, dependent upon the longitudinal displacement of the key 323. The counterweights 327 are moved 180°, that is, oppositely to that of the eccentrics 313, 317. This will be apparent by comparing the inclination of the teeth adapted for shifting the eccentrics 313, 317 with the inclination of those teeth adapted for shifting the counterweights, the former teeth moving these eccentrics downwardly and the latter moving the counterweights upwardly as keys 323 are moved to the left.

Associated with each working cylinder 307 and piston 309 is what may appropriately be called a composite valve mechanism of the double-acting type comprising a pair of valve elements 328 and 329. Valve element 328 may be termed, for convenience, a "fixed" valve element in view of its fixed throw or eccentricity, while valve element 329 may be termed a "variable" valve element.

Referring to Fig. 25, fixed valve element 328 comprises a cylinder 331, within which is reciprocably mounted a valve piston 332, preferably of the balanced spool type, having connecting extensions 333 secured to slipper elements 334, in any suitable manner, as by pins 335. The cylinder 331 is provided with a cylinder head 336 threadedly mounted thereupon and also with a high pressure port 337 and a low pressure port 338. Another port 339 is also provided in the cylinder 331, which port is connected through a passage 341 (Fig. 23) to a port 342 in the working cylinder 307. High pressure port 337 is connected to a high pressure passage or manifold 343, while the low pressure port 338 is connected to a low pressure passage or manifold 344. The piston 332 is preferably provided with piston rings 346 to permit better engagement with the inner wall of cylinder 331 and being of the double-acting type is enabled to control liquid flow from either the low pressure manifold 344 to the cylinder 307 or from the cylinder 307 to the high pressure manifold via port 339 and passage 341. The slippers 334 are also provided with rings 347 which retain them in contacting engagement with a fixed eccentric 348, which is secured to shaft 300 in any suitable manner, such as by a key 349 disposed in a keyway 351 of the shaft 300 and a complementary keyway 352 in the eccentric 348. In the particular embodiment disclosed in Fig. 25 it is to be noted that the eccentric 348 is disposed at an angle of 120° with respect to the angular displacement of the piston eccentrics 313, 317 and since the valve eccentric 348 is angularly unchangeable with respect to the shaft, the valve structure has been termed a "fixed" valve element.

Referring again to Fig. 23, the variable valve element 329 of the composite valve structure is similar in construction to the fixed valve element 328 and includes a cylinder 353, a spool-type valve piston 354 reciprocably movable therein and a cylinder head 355. As in the fixed valve structure, the valve piston 354 is connected by a connecting extension 356, which is pivotally secured by a pin 357 to a slipper element 358, which in turn is constrained by rings 359 in contacting engagement with an eccentric 361. Each cylinder 353 has a high-pressure port 360 connected with high pressure manifold 343 via passage 343', a low pressure port 362 connected with low pressure manifold 344 via passage 344', and a third port 363 connected to port 339 through a passage 364. It is to be noted at this point that each pair of valve elements 328, 329 for each composite valve structure comprises three sets of ports which are connected in parallel with each other. However, it is to be noted further that while the high pressure and low pressure manifolds 343, 344, respectively are common to all composite valves of the pump unit, passages 341 and 364 are individual to each composite valve.

Eccentric 361 is freely rotatable upon a bearing 367, preferably of bronze, which encircles shaft 300. A counterweight assembly 368 of appropriate shape is secured in any suitable manner, such as by bolts 369, to eccentric 361 to dynamically balance, as stated hereinbefore, the forces acting upon this portion of the shaft 300. Eccentric 361 is of the variable type and may be rotarily adjusted relative to shaft 300 in any of a number of well-known methods, the arrangement embodied herein comprising a bolt 371 inserted into and affixed to the eccentric 361 by a pin 372, which is held in locking position by combination of a washer 373 and snap ring 374 mounted upon shaft 300. The bolt 371 includes a freely rotatable roller 376 held thereon by bolt head 377. This bolt-roller-combination is disposed in an arcuate slot 378 provided in a revolvable sleeve member 379, which encircles a portion of eccentric 361 and which is shown integral with an extension 380 for supporting a shifting collar 381. The slot 378 may be helical or of any predetermined curvature and length. It can be readily seen that with the shaft 300 rotating, collar 381 and sleeve 379 will rotate therewith and compel bolt 371 to correspondingly rotate the eccentric 361. The rotary position of the eccentric 361 relative to shaft 300 is obviously determined by the position of bolt 371 in slot 378 and by varying the position of the sleeve 379 axially, the rotative position of bolt 371 and therefore of the eccentric 361 relative to shaft 300 may be correspondingly varied and the valve timing changed.

As shown in Fig. 23, the axial position of key 323, which varies the working piston stroke, is controlled by a pivotally-mounted manual control lever 382 coupled to this key through a longitudinally movable collar 383. In the illustration, the collar 383 and associated key 323 are at their extreme right positions, as viewed in the figure, which correspond to a full stroke position of the piston 309. It is readily apparent that the length of piston stroke may be reduced by shifting the manual control lever 382 to the right, in the direction of the arrow, whereby the collar 383 and associated key 323 are shifted to the left with consequent lowering of the eccentrics 313, 317 under influence of the segmental racks 318, so that the center of these eccentrics approaches that of the shaft 300. This is readily apparent from Fig. 24. To the manual control lever is affixed a cam 384 in any suitable manner, such as by pins 386, in cooperation with which is a bell crank 387 having a roller 388 revolvably mounted upon its lower arm 389 and in engagement with the surface of cam 384. The bell crank 387 is pivotally secured to the housing 304 in any well-known manner, such as by bracket assembly 391. The other arm 392 of the bell crank 387 is pivoted to one end of a link 393, the other end of which is pivoted to a lever arm 394, which is loosely pivoted on a pin 395. Lever arm 394 is normally retracted to the left (as viewed in Fig. 23) by a spring 396 secured at one end to a pin 397 of the lever arm 394, and at its other end to a bracket 398 fastened to the housing 304. By virtue of the spring 396, roller 388 is biased against the surface of cam 384 and readily follows the movement of the manual control lever 382.

Pivot pin 395 is carried by a lever arm 399 which is rigidly secured to a shaft 401, preferably of the splined type, which in turn has rigidly secured thereto one end of a lever 402 connected to the heretofore-mentioned shifting collar 381. At the lower end of lever arm 394 there is pivotally secured a link 403, which through piston rod 409 and pin 411 is connected to a piston 404 reciprocably movable within a cylinder 406 fastened to the housing 304, as shown. Conduit 407 interconnects the high pressure manifold 343 with one end of the cylinder. At the other end of the cylinder 406 is provided a spring member 408 for biasing the piston 404 to the left (as viewed in Fig. 23).

It can be thus seen that by varying the piston stroke through the manual control lever 382, the positions of levers 394, 399, 402, and eccentric 361 will be correspondingly varied (assuming no change in pressure), and that the positions of said levers and eccentric will be varied in response to variations of pressure in the high pressure manifold. Further by concomitant variations of the piston stroke and pressures in the high pressure manifold, a resultant movement of the levers 399 and 402 takes place. The lever system comprising levers 394 and 399 may be termed a "whiffle-tree" system. In other words, assuming for purposes of explanation that the pressure is constant in the high pressure manifold, a variation in the piston stroke, from the position shown, by movement of manual control lever 382 to the right, in the direction of the arrow, will move link 393 to the right and since link 403 is stationary, it will provide a fixed fulcrum for movement of the levers 394 and 399 to the right. Lever 399 in turn rotates lever 402 clockwise and in consequence the collar 381 is shifted longitudinally to the left. By shifting collar 381 to the left, sleeve 379 is likewise shifted longitudinally but, in view of the contour of slot 378, bolt 371 is moved rotarily, thereby changing the rotative position of the eccentric 361 relative to shaft 300 and thereby varying the timing of valve element 329.

Similarly, if the piston stroke is held constant and the pressure in the high pressure manifold 343 is changed, that is, assuming it is increased, then the piston 404 is forced to the right against spring 408. Link 403 carries the lower end of lever 394 with it, as well as pin 395, and, since the pivotal connection of lever 394 with link 393 now acts as a fulcrum, lever 399 is also moved to the right. The collar 381 and sleeve 379 are then moved to the left, the eccentric 361 and valve timing likewise being changed as in the preceding example. It is obvious that joint changes in the piston stroke and pressure will produce a resultant effect upon the eccentric 361.

The above-described pump unit may be a component part of a transmission unit, in which case it is connected to an associated motor unit (not shown) through high pressure and low pressure conduit lines 412 and 413, respectively, the direction of liquid flow being shown by the arrows.

In order to further explain the angular relationship between the working piston 309 on the one hand and associated valve pistons 332 and 354 on the other hand, reference will be had to Fig. 27, which illustrates by graphs the displacement angles of said pistons. It might be mentioned that the curves for the three pistons are based on a ratio of $$\frac{L}{R} = 5$$

where L is the length of the connecting rod and R is the radius of the crank or eccentric. Referring to the working piston displacement curve, at 0° the piston is at bottom dead center, at 180° it is at top dead center, and at 360° it is back to bottom dead center. The displacement of the fixed valve element piston is shown by curve A and the displacement of the variable valve element piston is shown by curve B, the latter curve of which varies in accordance with the correction required, dotted curve C showing one angular variation of curve B. The full line curves A and B, as shown, illustrate the normal condition of valve operation with respect to an associated piston in which elasticity correction is not provided. In other words, at bottom dead center of the working piston, namely 0°, valve element B opens to discharge, valve element A opens to discharge at 60°, valve element B closes to discharge at 120°, and valve element A closes to discharge at 180°, thus enabling the piston during its up stroke from bottom dead center to top dead center to compress liquid for the entire period of 180°. Similarly, at top dead center of the piston, namely 180°, valve element B opens to intake, valve element A opens to intake at 240°, valve element B closes to intake at 300°, and valve element A closes to intake at 360°, so that the piston during the stroke from top dead center to bottom dead center is enabled to take in liquid for the entire period of 180°. This would represent the condition at full stroke and minimum pressure whereby practically no correction is required to compensate for elasticity losses. However, as the pressure increases and the stroke decreases, the timing of the variable valve element 329 changes and the curve B thereof approaches curve A of the fixed valve element, so that at the maximum correction requirement the curves A and B coincide. The cross-hatched areas at the left of Fig. 27 represent the discharge period while the middle cross-hatched areas thereof represent the intake period. The invention is thus applicable to units operable over a range starting at a point where substantially no elasticity correction is required and ending where maximum elasticity correction of about 60° is required.

Figure 28:
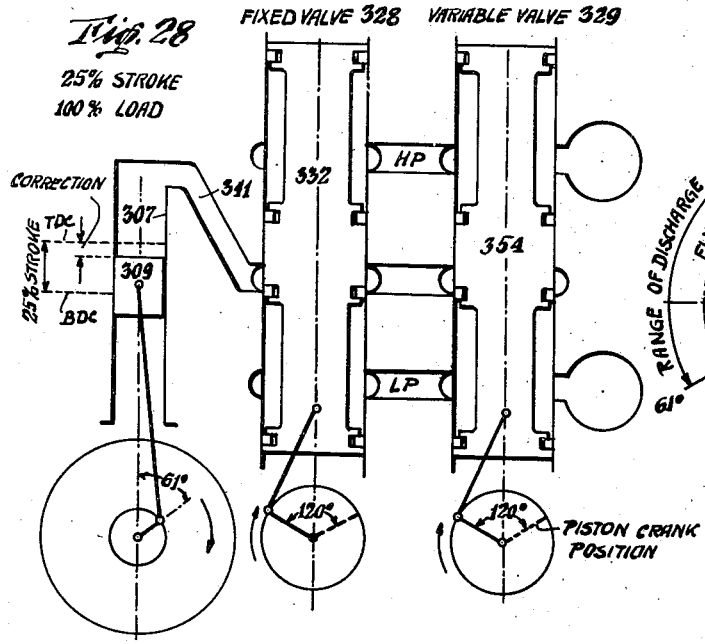
Figure 29:
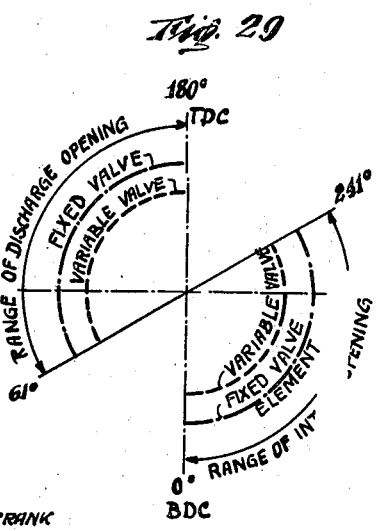

To further illustrate the timing relationship between the working piston 309 and its associated fixed and variable valve pistons 332 and 354, respectively, reference may be had to Figs. 28 to 35, inclusive, each of which discloses the variable valve element piston 354 at the moment of opening to intake. In Fig. 28 is shown a condition wherein the working piston has a 25% stroke and delivers a load of 100% power. This represents the worst condition, due to high pressure, short piston stroke, and large head volume, involving maximum losses to the hydraulic system if uncorrected, and therefore requires substantially maximum elasticity correction. As shown, both the fixed and variable valve element pistons are synchronous in angular phase, lagging the piston substantially 120°. It is to be understood that the piston rings of both valves are so disposed that valve opening is initiated as soon as one-half of the piston ring passes the valve port. The direction of movement of the eccentrics for all pistons are clockwise, as shown by the arrows. In Fig. 29 is illustrated the same condition but in a different manner. In other words, both valves open for liquid intake at 61° past top dead center and close at bottom dead center, these valves likewise opening for liquid discharge 61° past bottom dead center and closing at top dead center.

Figure 30:
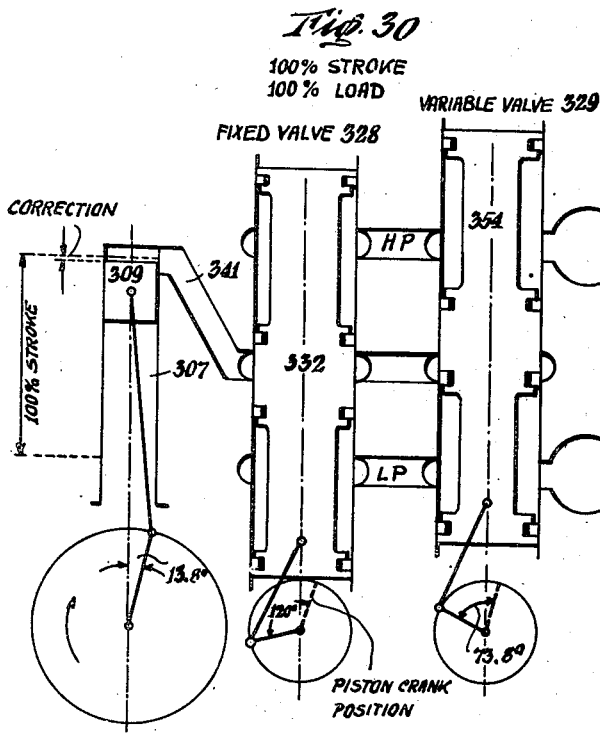
Figure 31:
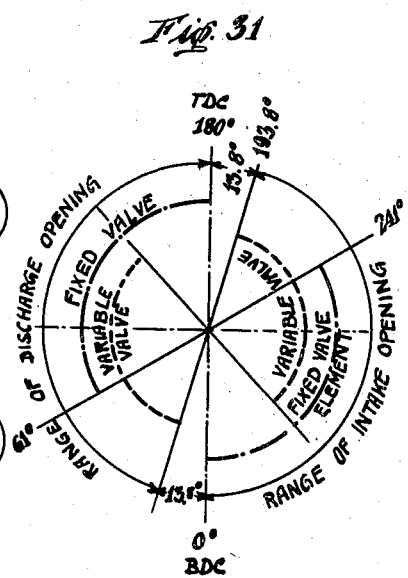

In Figs. 30 and 31 is shown a condition wherein the working piston has a 100% stroke and delivers a load of 100% power. Since the stroke is maximum, the pressure is lower and the head space is smaller, so that the elasticity correction is much less than that required when the stroke is at its minimum position, and in this instance the opening of the valves is delayed 13.8° only. As shown in Fig. 31, it can be seen that the variable valve element piston 354 on the intake stroke opens 13.8° after top dead center and closes 120° later. In the meantime, the fixed valve 332 opens at 61° after top dead center and closes at bottom dead center so that the range of intake opening is 166.2°. Similarly, the range of discharge opening is 166.2°. In Figs. 32 and 33 the same 100% stroke condition is shown but with the power delivery cut in half. In other words, since the pressure has been reduced in the high pressure manifold, less correction is required to compensate for the elasticity loss. Therefore, a 9.8° correction is required in this case, as against the 13.8° correction required for the same stroke but with 100% load. In Figs. 34 and 35 the stroke of the preceding example has been cut in half, the power output remaining the same, namely, 50% stroke, 50% load. Since the stroke has been reduced, the pressure in the high pressure manifold is correspondingly increased and the correction required for elasticity compensation is also increased, as represented by the 20.3° against the 9.8° for 100% stroke and 50% power. The relationship of stroke, pressure, and load with the consequent elasticity correction required for the above examples is additionally illustrated in the four curves shown in Fig. 46. Further examples may be illustrated for indicating the elasticity correction required, but it is not deemed necessary in that the percentage of correction may be readily calculated from the mathematical equations described hereinbefore.

In explaining the operation of the pump unit of the transmission, it might be mentioned that the disposition of the working piston 309 and valve element pistons 332 and 354 is substantially for the condition schematically disclosed in Fig. 30, namely, 100% stroke and 100% load. In other words, piston 309, as shown, is at full stroke with 100% delivery of power or load and the fixed valve element piston 332 is disposed at 120° in lagging relationship therewith, while the variable valve piston 354 lags the piston by 73.8°. Since the piston 309 is shown at top dead center, the fixed and variable valves 328 and 329, respectively, are closed, the variable valve element piston 354 being so positioned as to open within 13.8° after the piston 309 will have passed top dead center. Now, to change from 100% stroke to, say 25% stroke under the same load condition, as shown schematically in Fig. 28, the manual control lever 382 (Fig. 23) will be moved to the right, in the direction of the arrow, and roller 388 will be raised to or near the high point of cam 384, bell crank 387 will be rotated clockwise, link 393 will be shifted to the right, and the upper portion of lever 394 likewise will be shifted to the right. The pressure in the high pressure manifold will increase from, say, about 750 pounds per square inch at 100% stroke, to, say about 3,000 pounds per square inch at 25% stroke (Fig. 46) but for purposes of simplifying the description assume for the moment immediately following movement of the above manual control lever 382 that the pressure is constant in the high pressure line, then link 403 will act as a fulcrum and cause lever 399 to be rotated clockwise by lever 394, whereby under the influence of lever 399 collar 381 will be shifted to the left. Thus, sleeve 379 being shifted longitudinally to the left will compel pin 371 to move spirally, for example, to the dotted position shown in Fig. 26 and thereby vary the rotative position of eccentric 361 with respect to shaft 300. The shifting of eccentric 361 will be increased by movement of piston 404, responsive to increase of pressure to 3,000 pounds per square inch in the high pressure manifold, so that the eccentrics of valve piston 354 and valve piston 332 will be in phase with each other. As viewed in Fig. 23, the lower edge of eccentric 361 will then be in alignment with the lower edge of the fixed eccentric 348 for valve piston 332. If the manual control lever 382 is later returned to the above initially assumed condition, it is obvious that the movement of the various linkage elements will occur in a reverse manner, so that the eccentricity of the variable valve element piston 354 and, correspondingly the elasticity correction, will be decreased and the linkage restored to the original condition.

Assuming a change from a 100% stroke and 100% load condition (Figs. 30 and 31) to a 100% stroke and 50% load condition (Figs. 32 and 33), no movement, obviously, of the manual control lever 382 is required, the drop in load form 100% to 50% resulting from a change in demand upon the pump unit. Under this assumption the pressure in the high pressure manifold 343 drops and the piston 404 within cylinder 406 is retracted to the left, as viewed in Fig. 23, by spring 408. The upper pivotal portion of lever 394 performs the function of a fulcrum, and the lower portion thereof is moved clockwise by link 403 and connecting rod 409, whereby levers 399 and 402 are rotated counter-clockwise upon shaft 401. Collar 381 and sleeve 379 accordingly are shifted longitudinally to the right and bolt 371 and roller 376 are disposed towards the left extremity of the slot 378. Inasmuch as eccentric 361 is rotated under influence of the bolt 371, the amount of elasticity correction is reduced, whereby the variable valve element 329 is effective to initiate opening to intake at 9.8° after the working piston 309 has passed top dead center (see Fig. 32 for condition explained above). In the event that the load requirement calls for a higher pressure with the same stroke position as described above, the actions of the various lever and collar members will be in a reverse direction so as to increase the elasticity correction and correspondingly to delay the opening to intake and delivery of the variable valve element piston 354 with respect to the working piston 309.

Thus it is apparent that changes in both the working piston stroke and load will effect a resultant movement of collar 381 with corresponding change in the rotary position of variable valve eccentric 361. It may, therefore, be stated that the variable valve element 329 is responsive to individual variations of the working piston stroke or of pressures in the high pressure manifold 343, as well as to joint variations thereof.

During the operation of the pump unit shown in Fig. 23 the liquid circuit may be traced from conduit line 413 into low pressure manifold 344 and thence, assuming the variable valve element 329 opens first, through passage 344', ports 362, 363, through passages 364 and 341, after which the liquid is drawn within the interior of cylinder 307 during the intake stroke of piston 309. During the compression stroke, again assuming the variable valve 329 opens first, the high pressure liquid is discharged from the cylinder 307 into passages 341 and 364, and thence through ports 363 and 360 via passage 343' into high pressure manifold 343 and thence through conduit 412 to a motor (not shown) or other fluid utilizing means (not shown). Since the fixed valve 328 may open a predetermined time interval after that of the variable valve 329, the liquid circuit controlled by this valve may be traced as follows: starting with the liquid intake from conduit 413 and low pressure manifold 344, the liquid is passed through ports 338 and 339 into passage 341 and thence into the cylinder 307 during the intake stroke of the piston 309. It is to be noted that while both the fixed and variable valve elements 328 and 329 are open, that a parallel circuit is provided for flow of intake liquid to the cylinder. During the discharge period the compressed liquid is forced along passage 341 through ports 339 and 337 into the high pressure manifold 343, and thence into conduit 412. Similarly, during the discharge period the high pressure liquid is forced in parallel paths through valve elements 328, 329 into the high pressure manifold, during those periods when both valve elements are open.

Referring to Figs. 36 and 37, there is shown another embodiment of a variable-stroke pump unit in which the teachings of this invention are applied, single-acting instead of double-acting valves being employed for controlling flow of liquid to and from a working cylinder. In this embodiment a separate composite valve is employed for the intake condition and for the discharge condition. In view of the use of separate valve units, individual linkage systems are required for each valve condition, both linkages being adapted for connection to respective cam means disposed upon a manual control lever. Otherwise the embodiment shown in these figures is analogous to the preceding embodiment.

Referring now to Fig. 36, there is shown a driving shaft 450, which may be coupled to any suitable source of power and which is supported upon anti-frictional bearings 451 and 452 mounted within the housing 453 of the unit. Within the housing 453 are disposed a plurality of working cylinders 454, preferably of the radial type, having cylinder heads 456 secured to the housing by bolts 457. Working pistons 458 are reciprocatingly mounted within the cylinders 454 and are coupled by connecting rods 459 to slippers 461 for articulation by an eccentric 462, rings 463 restraining the slippers 461 in contacting engagement with the eccentric. Eccentric 462 is of the single annular type and its eccentricity may be varied in any suitable manner, such as by tooth racks 464, in mesh with pinions 466, which are actuated by a pair of longitudinal keys 467 disposed in keyways 468 in opposite faces of shaft 450. A pair of counterweights 469 are provided for the working piston eccentric 462 and, in accordance with the usual practice, the counterweights are disposed at 180° with respect to the eccentric 462 and are varied in accordance with movement of the keys 467, pinions 466 also meshing with counterweight racks 470 for varying the dispositions thereof.

Associated with each working cylinder on the intake side is a composite valve structure comprising a fixed intake valve element 471 and a variable intake valve element 472 of the single-acting type. In the fixed valve element 471 a cylinder assembly 473 is provided with a port 474 having access to a low pressure manifold 476 and passage 477 to the cylinder 454. Reciprocatingly mounted within the cylinder 473 is a spool-type valve piston 478 having an extension 479 coupled to a slipper element 481 by a pin 482. Rings 483 constrain the slipper in contacting engagement with an eccentric 484, which is keyed to shaft 450. A fixed counterweight 486 is also keyed, adjacent to the eccentric 484, to the shaft 450. The angular phase relationship of the valve piston 478 with respect to the working piston 458 is set at the maximum elasticity correction required. In this embodiment this correction is calculated to be approximately 70°.

In the variable valve element 472 there is shown a cylinder assembly 487 having a port 488, which interconnects the low pressure manifold 476 via passage 489 and with cylinder 454 via passages 490 and 477. It is to be noted that an individual passage 477 is provided for each composite intake valve. A variable valve piston 491, also of the spool type, is shown coupled by extension 492 to a slipper 493 by a pin 494, the slipper 493 being constrained by a ring 495 in contacting engagement with a variable eccentric 496. A counterweight 500 is secured to the eccentric 496 in any suitable manner, as, for example, in a manner similar to that shown in Fig. 23. For simplicity, the manner in which the variable eccentric 496 is varied is similar to that heretofore disclosed in Fig. 23 and comprises a pin-roller assembly 497, which is secured to eccentric 496 and which is spirally movable in a slot 498 provided in a sleeve 499 formed as part of a collar assembly 501 splined for longitudinal movement along shaft 450. A lever 502 is rigidly secured at its upper end to a shaft 503, the lower end thereof being connected to collar 501. This lever serves to vary the longitudinal position of collar 501 and, in turn, the rotative position of eccentric 496 in a manner similar to that heretofore described.

On the discharge side of the working cylinder 454 is shown a composite valve comprising a fixed discharge valve element 504 and a variable discharge valve element 505 identical with that of the composite intake valve structure. In the fixed valve element 504 there is disclosed a cylinder assembly 506 having a port 507 connecting the cylinder 506 via discharge passageway 508 with a high pressure manifold 509. A valve piston 511 of the spool type is reciprocable in cylinder 506 and is connected to a slipper 512 by a pin 513, the slipper 512 being retained by a ring 514 in contacting engagement with an eccentric 516 fixedly mounted upon shaft 450. A counterweight 517 is also shown fixedly mounted to shaft 450. The variable valve 505 similarly comprises a cylinder assembly 518 having a port 519 for connecting the high pressure manifold 509 via passage 521 with working cylinder 454 via passages 522 and 508. A valve piston 523 of the spool type is reciprocable in cylinder 518 and is connected to a slipper 524 by a pin 526, the slipper being retained by a ring 527 in contacting engagement with a variable eccentric 528 loosely mounted on shaft 450. Like the variable intake valve element 472, the variable eccentric 528 is provided with a counterweight 530 and is adjustable through a pin-roller assembly 529 secured thereto, which assembly is movably disposed in a spiral slot 531 provided in a sleeve member 532; which in turn is preferably formed as part of a collar assembly 533 splined to shaft 450 for longitudinal movement thereon. A lever 534 pivotally mounted on shaft 536 is connected to collar 533 and is adapted for varying the longitudinal position thereof and, consequently, the rotative position of the variable eccentric 528 relative to shaft 450.

The linkage for the discharge composite valve will first be described. Lever 534 is connected at its upper end to a pin 537, to which is pivotally connected lever 538 at an intermediate point thereof. The lower extremity of lever 538 is pivoted to a link 539, which in turn is coupled to a connecting rod 541 secured to a piston 542 reciprocably mounted in cylinder 543. Between the piston 542 and head of cylinder 543 is disposed a spring member 544 for biasing the piston to the right, as viewed in Fig. 36, while the right end of the cylinder is connected by a conduit 546 to the high pressure manifold 509. The upper extremity of lever 538 is pivotally connected to one end of a link 547, the other end thereof being pivotally connected to the extremity of an arm 548 of a bell crank 549, which is pivotally supported upon a bracket 551 secured to the housing in any suitable manner, such as by bolts 552. The other arm 553 of bell crank 549 has mounted on its free end a roller 554, which is maintained in contact with the surface of a cam 556 secured to a manual control lever 557. The roller 554 is biased against the surface of cam 556 by a spring member 558, one end of which is secured to lever 538 and the other end of which is secured to the housing 453. Manual control lever 557 is pivotally mounted upon a shaft 559, the lower extremity of said lever being connected, as shown, to key 467 for varying the length of stroke of working piston 458.

Referring now to Fig. 37, the linkage for the intake composite valve will be described. As has been brought out in the mathematical calculations hereinbefore, the amount of elasticity correction for the intake valve is slightly different from that required for the discharge valve and, accordingly, the contours of the respective cams provided in the linkages will likewise be slightly different. As shown, cam 561 of a slightly different contacting surface from cam 556 is also mounted in spaced relationship upon manual control lever 557, a roller 562 being adapted for engagement therewith. This roller is mounted upon an arm 563 of a bell crank 564 pivotally mounted on a bracket 566, which is supported upon the housing 453. A spring member 567, having one end thereof fastened to the housing 453 and the other end to an extension 568 of bell crank arm 563, serves to bias the roller 562 against the surface of cam 561. The other arm 569 of bell crank 564 is pivotally connected to one end of a link 571, the other end thereof being pivotally connected to the upper extremity of a lever 572, which is provided with a pin 573 adjacent its lower end. To pin 573 is pivotally connected a lever 574 rigidly secured to bolt 503, which, as mentioned hereinbefore, has also rigidly secured thereto lever 502 adapted for varying the adjustment of eccentric 496 through collar 501. At the lower extremity of lever 572 is pivotally connected a link 576, which in turn is pivotally connected to one end of a connecting rod 577, the other end of which is secured to a piston 578 reciprocably disposed within a cylinder 579. Between piston 578 and the head of cylinder 579 is placed a spring member 581 for biasing the piston to the right, as viewed in Fig. 37. The right end of cylinder 579 is connected by a conduit 582 to the high pressure manifold 509.

Referring now to Figs. 38 to 45 inclusive, there are shown schematic views illustrating the phase angular relationship existing between the working piston and associated valves for various percentages of load and stroke, Figs. 38, 40, 42, and 44, illustrating the positions of the pistons at the moment of intake valve opening, and Figs. 39, 41, 43, and 45, illustrating the positions of the pistons at the moment of discharge valve opening. As indicated hereinbefore, the elasticity corrections for the intake and discharge valves are slightly different, as will be evidenced from, for example, a comparison of Fig. 38 with Fig. 39 where the moment of intake opening occurs 7° 55′ after the working piston has passed top dead center, while for the discharge condition the working piston has passed bottom center by 9° 26′ before the discharge valve opens. As shown in Figs. 44 and 45, the maximum elasticity correction required is about 70° for the intake valve and about 73° for the discharge valve. The four conditions of load and stroke illustrated in Figs. 38, 40, 42, and 44 for the intake valve and Figs. 39, 41, 43, and 45 for the discharge valve are shown graphically in Figs. 47 and 48, respectively.

The operation of the pump unit disclosed in Figs. 36 and 37 will now be described. Let it be assumed for purposes of description that the arrangement of working piston and associated valves is in accordance with Figs. 44 and 45. In other words, the working piston 458 is assumed to have a stroke of 25% and operating under a load of 100%. Under this assumption the unit will require maximum elasticity correction, and accordingly the angular displacement of the eccentrics 484 and 496 for the intake valve elements will be identical. Also, the angular displacement of the eccentrics 516 and 528 for the discharge valve elements will be identical. Since the working piston is substantially at top dead center, all valves will be closed and, in accordance with Fig. 44, intake valves 471 and 472 will open 70° after the working piston 458 has passed top dead center. To increase the piston stroke, for example, from 25%, as shown in Figs. 44 and 45, to 100%, as shown in Figs. 42 and 43, the manual control lever 557 will be moved counterclockwise, that is, in the direction of the arrow, as shown in Fig. 36. Responsive to movement of lever 557, rollers 554 and 562 will roll in a downward direction in their respective cams 556 and 561 and in turn produce a clockwise rotation of bell cranks 549, 564, respectively. Links 547 and 571 are accordingly shifted to the right and, assuming momentarily that the pressure is unchanged during this movement, links 539 and 576 remain fixed. The lower ends of levers 538 and 572, respectively, are therefore fulcrumed and levers 538 and 572 being rotated clockwise, carry with them pins 537 and 573, respectively. For the intake valve, lever 574 is accordingly rotated clockwise to move collar 501 to the left and thereby decrease the adjustment of eccentric 596. Correspondingly, for the discharge valve, lever 534 is rotated clockwise to shift collar 533 to the left and likewise decrease the adjustment of eccentric 528. The adjustment of eccentrics 496 and 528 will be further decreased upon drop of pressure in the high pressure manifold 509, as required, as may be seen in the curves of Figs. 47 and 48. In the event that the manual control lever 557 is returned to the original assumed position, the operation of the linkage system will be reversed.

As explained hereinbefore, a change of the manual control lever 557 from one position to another also produces a corresponding change in the pressure, which modifies the linkage setting and in this instance imparts a resultant movement to the levers 574 and 534 of the intake and discharge linkages, respectively, which in turn vary the eccentrics 496 and 528, respectively. If, however, the manual control lever 557 is maintained in a fixed position and the load upon the system should decrease, it is clear that the operation will be somewhat similar to that described for the double-acting valve in Fig. 23. In that case the spring member 544 of the discharge linkage forces the piston 542 to the right, in view of the decrease in pressure in the high pressure manifold 509, which piston in turn forces link 539 to the right and thereupon carries lever 534 also to the right to reduce the adjustment of eccentric 528. A similar operation will obtain in Fig. 37 upon decrease in pressure of the high pressure manifold, whereby the adjustment of eccentric 496 is reduced.

Referring to Fig. 36, the liquid flow circuit during downward or intake stroke of the piston 458, assuming the variable valve element 472 has opened a predetermined interval after the piston 458 has passed top dead center, may be traced from the inlet conduit 580, low pressure manifold 476, passage 489 into cylinder 487, out through port 488 into passage 490, around fixed valve element 471, which is still closed, and thence through passage 477 into the cylinder 454. At a predetermined interval following opening of the variable valve element 472 the fixed valve element 471 opens and initiates liquid flow in parallel with that through the variable valve element 472, the circuit thereof being traced from the low pressure manifold 476 into cylinder 473, out through port 474, and through passage 477 into the cylinder 454, this liquid flow continuing for a predetermined period after the variable valve 472 has closed and being interrupted upon the piston 458 reaching bottom dead center.

During the upward or discharge stroke of the working piston 458, again assuming the variable valve element 505 only has opened a predetermined interval after the piston 458 has passed bottom dead center, the liquid circuit may be traced from cylinder 454 through passage 508, around fixed valve 504, which is still closed, through passage 522 and port 519 into cylinder 518, and thence through passage 521 and high pressure manifold 509 to a fluid utilizing device (not shown) via high pressure conduit 587. At a predetermined interval later the fixed valve element 504 opens and liquid flow takes place, in parallel with the above-traced circuit, from the cylinder 454 through passage 508, port 507, into cylinder 506, and thence through high pressure manifold 509 to conduit 587, this liquid flow continuing for a predetermined period after the variable valve element 505 has closed and being interrupted upon the piston 458 reaching top dead center.

To briefly recapitulate the hereinbefore teachings of this invention, there is achieved a new method of transmitting power by liquid. According to one aspect, this method might be defined as follows: Liquid is subjected to pressure to an extent such that it is compressed to a measurable degree. The compressed liquid is permitted or guided to flow to a point at which it may perform useful work. Either at this point or at the point at which it is subjected to pressure, or at both points and after the flow of liquid has been substantially interrupted, it is allowed to expand. Under such expansion it again performs useful work. Accordingly, not alone is energy recovered which was employed in placing the liquid under pressure but also there is recovered the energy which went into compressing the liquid.

While the invention has been shown and described as embodying certain features merely for the purpose of illustration, it is clear to anyone skilled in the art that many modifications are possible by the substitution of mechanical equivalents without departing from the spirit of the invention and the scope of the appended claims. The invention is therefore not to be understood as being limited to the specific arrangements shown, but includes, necessarily, any other known or suitable arrangement of similar scope which can be adapted by a person skilled in the art to the performance of the functions hereinbefore described.

What is claimed is:

1. A hydraulic unit comprising, in combination, a cylinder, a piston reciprocable therein, means for varying the length of the stroke of said piston, said cylinder having a port for the passage of liquid, adjustable valve means for opening and closing said port, and means interconnecting said piston stroke varying means and valve means for changing the time of opening of said port in accordance with length of the piston stroke.

2. A hydraulic unit comprising a cylinder, a piston reciprocable within said cylinder, said piston having a variable stroke, valve means for controlling ingress and egress of liquid to and from said cylinder, and means responsive to the stroke setting of said piston for timing the operation of said valve means.

3. A hydraulic unit comprising a cylinder, a piston reciprocable within said cylinder, said piston having a variable stroke, valve means for controlling ingress and egress of liquid to and from said cylinder, means responsive to the stroke setting of said piston, means responsive to the pressure of liquid discharged by said cylinder, and means responsive to resultant action of the two preceding means for timing the operation of the valve means, to vary the period of liquid ingress.

4. A hydraulic unit comprising a cylinder, a piston reciprocable within said cylinder, said piston having a variable stroke, valve means including an adjustable eccentric for controlling ingress and egress of liquid to and from said cylinder, means responsive to the stroke setting of said piston, means responsive to pressure of the liquid discharged by said cylinder, and means responsive to the two preceding means for adjusting said eccentric, whereby the periods of said liquid ingress and egress may be changed.

5. A composite valve mechanism for varying ingress and egress of liquid to and from a pump cylinder having a working piston of variable stroke comprising, in combination, a valve piston, fixed eccentric means for actuating said piston, a second valve piston cooperating with said first valve piston, adjustable eccentric means for actuating said second valve piston, and automatic means responsive to the stroke of said working piston for adjusting said second eccentric means, whereby the timing of said composite valve mechanism is varied.

6. A composite valve mechanism for varying ingress and egress of liquid to and from a pump cylinder having a working piston of variable stroke for compressing said liquid comprising, in combination, a valve piston, fixed eccentric means for actuating said piston, a second valve piston for joint operation with said first valve piston, adjustable eccentric means for actuating said second valve piston, a valve cylinder for each of said valve pistons, and automatic means responsive to the pressure developed by said working piston for adjusting said second eccentric means, whereby the timing of said composite valve mechanism is varied.

7. A valve mechanism for controlling ingress and egress of liquid to and from a housing comprising, in combination, a pair of valve cylinders, each of said valve cylinders having a plurality of sets of ports, one of said sets of ports being connected to a high-pressure passage, a second set of said ports being connected to a low-pressure passage, a third set of said ports being connected to a port in said housing, and a valve piston for each of said valve cylinders for interconnecting said passage ports and said housing ports.

8. A valve mechanism for controlling ingress and egress of liquid to and from a cylinder having a piston therein actuated by a shaft comprising, in combination, a pair of valve cylinders connected in parallel, each of said valve cylinders having a plurality of sets of ports, one of said sets of ports being connected to a high-pressure passage, a second set of said ports being connected to a low-pressure passage, a third set of said ports being connected to a port in said cylinder, a reciprocating valve piston actuated by said shaft for each of said valve cylinders for interconnecting said passages with said cylinder port, and means for varying the phase of one of said valve pistons with respect to the first-mentioned piston.

9. A valve mechanism for controlling ingress and egress of liquid to and from a cylinder having a piston therein actuated by a shaft for compressing the liquid comprising, in combination, a pair of valve cylinders connected in parallel, each of said valve cylinders having three sets of ports, one of said sets of ports being connected to a common high-pressure passage, a second set of said ports being connected to a common low-pressure passage, a third set of said ports being connected to a port in said cylinder, a valve piston actuated by said shaft for each of said valve cylinders for interconnecting said passages via said third set of ports with said cylinder port, and means responsive to the liquid pressure in said high-pressure passage for varying the phase displacement of one of said valve pistons with respect to the first-mentioned piston.

10. A valve mechanism for controlling ingress and egress of liquid to and from each of a plurality of cylinders having variable stroke pistons therein actuated by a shaft for compressing the liquid comprising, in combination, a pair of valve cylinders for each of said cylinders, each of said valve cylinders having three sets of ports, one of said sets of ports being connected to a common high-pressure manifold, a second set of said ports being connected to a common low-pressure manifold, a third set of said ports being connected in parallel to an associated port in each of said cylinders, a valve piston for each of said valve cylinders, each of said valve pistons being actuated by said shaft and being effective to interconnect said manifolds via said third set of ports with said cylinder port, and means responsive to the stroke of said first piston for varying the angular displacement of one of said valve pistons with respect to the first piston.

11. A valve mechanism for controlling ingress and egress of liquid to and from each of a plurality of cylinders having variable stroke pistons therein actuated by a shaft for compressing the liquid comprising, in combination, a pair of valves for each of said cylinders, each of said valves having three sets of ports, each set of said ports of one valve being connected in parallel with a corresponding set of said ports of the other valve, one of said sets of ports being connected to a common high-pressure manifold, a second one of said sets of ports being connected to a common low-pressure manifold, a third one of said sets of ports being connected to an associated port in each of said cylinders, a valve piston for each of said valves actuated by said shaft for interconnecting said manifold via said third set of ports with said associated cylinder port, and means responsive to the stroke of said first piston for varying the angular displacement of one of said valve pistons with respect to the first piston.

12. A hydraulic unit comprising, in combination, a cylinder having a port for passage of liquid into and out of said cylinder, a piston of variable stroke reciprocable within said cylinder, an input shaft for driving said piston, a composite valve for timing the opening and closing instants of said port, said composite valve comprising a fixed valve element and a variable valve element, an eccentric fixedly connected to said shaft for actuating said fixed valve element, an eccentric adjustably connected to said shaft for actuating said variable valve element, means adaptable for spiral movement along said shaft for adjusting the rotary position of said adjustable eccentric, a collar member movable axially along said shaft for imparting said spiral movement to said last-mentioned means, linkage means for determining the axial position of said collar member, a manually operable member for controlling said linkage, said last member being adapted for varying the stroke of said piston, and means responsive to pressure of the liquid delivered by said cylinder for further controlling said collar member.

13. A hydraulic unit comprising, in combination, a cylinder having a port for passage of liquid into and out of said cylinder, a piston of variable stroke reciprocable within said cylinder, said piston adapted for imparting energy to said liquid, an input shaft for driving said piston, a composite valve for timing the opening and closing instants of said port, said composite valve comprising a fixed valve element and a variable valve element, an eccentric fixedly connected to said shaft for actuating said fixed valve element, an eccentric adjustably connected to said shaft for actuating said variable valve element, means adaptable for spiral movement along said shaft for adjusting the rotary position of said adjustable eccentric, a collar member movable axially along said shaft for imparting said spiral movement to said last-mentioned means, linkage means for determining the axial position of said collar member, a manually operable member for controlling said linkage, said last member being adapted for varying the stroke of said piston, and means responsive to pressure of the liquid delivered by said cylinder for further controlling said linkage, said variable valve element in response to said adjustable eccentric being adapted for maintaining said port closed a time interval after said piston has passed top dead center, whereby the potential energy of the compressed liquid entrapped within the cylinder is converted into work upon said piston.

14. A hydraulic unit comprising, in combination, a cylinder having a port for passage of liquid into and out of said cylinder, said piston adapted for imparting energy to said liquid, a piston of variable stroke reciprocable within said cylinder, an input shaft for driving said piston, a composite valve for timing the opening and closing instants of said port, said composite valve comprising a fixed valve element and a variable valve element, an eccentric fixedly connected to said shaft for actuating said fixed valve element, an eccentric adjustably connected to said shaft for actuating said variable valve element, means adaptable for spiral movement along said shaft for adjusting the rotary position of said adjustable eccentric, a collar member axially movable along said shaft for imparting said spiral movement to said last-mentioned means, linkage means for determining the axial position of said collar member, a manually operable member for controlling said linkage, said last member being adapted for varying the stroke of said piston, and means responsive to pressure of the liquid delivered by said cylinder for further controlling said linkage, said fixed valve element in response to said fixed eccentric being adapted for opening said port a fixed interval after said piston has passed top dead center and for closing said port at bottom dead center, said variable valve element in response to said adjustable eccentric being adapted for opening said port in advance of said fixed valve element an interval of time inversely proportional to the stroke of said piston.

15. A hydraulic unit comprising, in combination, a cylinder having intake and exhaust ports, a piston reciprocable within said cylinder, said piston having a variable stroke, a shaft for driving said piston, manual means for varying said piston stroke, variable valve means for each of said ports for controlling flow of liquid therethrough, means for varying the timing of said valve means, a separate linkage for interconnecting each of said valve-timing means and said manual means, said linkage being independently responsive to movement of said manual means, and means responsive to pressure of the liquid delivered through said discharge port for biasing each of said linkages, whereby said valve timing is varied in accordance with the resultant effect produced by said manual means and said pressure-responsive means.

16. A hydraulic unit comprising, in combination, a cylinder having an intake port and a discharge port, a piston of variable stroke reciprocable within said cylinder, a manually operable member for varying said piston stroke, a shaft for driving said piston, variable valve means for each of said ports for controlling flow of liquid therethrough, individual means for varying the timing of each of said valves, each of said valve-timing means comprising a variable eccentric adjustably connected to said shaft, a collar member on said shaft for adjusting said variable eccentric, a linkage for interconnecting said collar member and said manually operable member, and means responsive to pressure of the liquid delivered through said discharge port for biasing said linkage.

17. A hydraulic unit comprising, in combination, a cylinder having an intake port and a discharge port, a piston of variable stroke reciprocable within said cylinder, a manually operable member for varying said piston stroke, a shaft for driving said piston, variable valve means for each of said ports for controlling flow of liquid therethrough, individual means for varying the timing of each of said valve means, each of said valve-timing means comprising a variable eccentric adjustably connected to said shaft, a collar member on said shaft for adjusting said variable eccentric, a cam carried by said manually operable member, a linkage for interconnecting said collar member and said cam, and a piston responsive to pressure of the liquid delivered through said discharge port for biasing said linkage.

18. A hydraulic unit comprising the combination with a cylinder and piston of a valve mechanism for controlling the intake of low pressure fluid into said cylinder on the suction stroke and the exhaust of high pressure fluid from said cylinder on the compression stroke, means for timing the operation of said valve mechanism, and means responsive to the exhaust pressure developed by the unit to vary the operation of said timing means to admit low pressure fluid to said cylinder only after the suction stroke has reduced the pressure therein to substantially that of said low pressure fluid.

19. A hydraulic unit comprising the combination with a cylinder and piston of a valve mechanism for controlling the intake of low pressure fluid in said cylinder on the suction stroke and the exhaust of high pressure fluid from said cylinder on the compression stroke, means for timing the operation of said valve mechanism, means for varying the length of piston stroke and means responsive to the length of piston stroke for controlling the operation of said timing means to admit low pressure fluid to said cylinder only after the suction stroke has reduced the pressure therein to substantially that of said low pressure fluid.

20. A hydraulic unit comprising the combination with a cylinder and piston of a valve mechanism for controlling the intake of low pressure fluid into said cylinder on the suction stroke and the exhaust of high pressure fluid from said cylinder on the compression stroke, means for timing the operation of said valve mechanism, means for varying the length of piston stroke, and means responsive both to said exhaust pressure and to variations in the length of piston stroke for controlling the operation of said timing means to admit low pressure fluid to said cylinder only after the suction stroke has reduced the pressure therein to substantially that of said low pressure fluid.

21. A hydraulic unit comprising the combination with a cylinder and piston of a valve mechanism for controlling the intake of low pressure fluid and the exhaust of high pressure fluid to and from said cylinder including a plurality of spool type valves connected in parallel, and means for adjusting said mechanism to vary the timing of said valve mechanism including an adjustable mechanism for actuating one of said valves.

22. A hydraulic pump having a cylinder and piston reciprocable relative to one another, a relatively low pressure passage and a relatively high pressure passage connected to the cylinder of said pump, valves in said passage for controlling the flow of liquid to and from said pump cylinder, and driving means for said pump and said valves including timing mechanism for maintaining said high pressure passage valve open during substantially the entire discharge stroke of said pump, for closing said high pressure passage valve before initiation of the suction stroke of said pump, and for maintaining said high pressure passage valve closed during substantially the entire suction stroke, and timing mechanism for maintaining said low pressure passage valve closed throughout substantially the entire discharge stroke of said pump and during the initial stages of the suction stroke, whereby liquid within the cylinder at the completion of the discharge stroke may expand and react against the cylinder and piston to cause relative movements thereof at the initiation of the suction stroke, and for maintaining said low pressure passage valve open during the remainder of the suction stroke.

23. A hydraulic pump having a cylinder and a piston reciprocable relative to one another, inlet and outlet passages leading to and from said cylinder, inlet and outlet valves in said passages for controlling the flow of liquid to and from said pump cylinder, driving means for operating said valves from open to closed positions and from closed to open positions in predetermined timed relation with the stroke of the pump piston, said driving means including timing mechanism for opening said inlet valve at a fixed point in the piston cycle namely on the suction stroke a predetermined interval after top dead center, and for opening said outlet valve at a point in said cycle less than one-half cycle after the opening of the inlet valve.

24. A hydraulic pump as claimed in claim 23 in which the driving means includes mechanism for closing the outlet valve before the piston passes top dead center, and for closing the inlet valve before the piston passes bottom dead center.

25. A hydraulic pump as claimed in claim 23 in which the driving means includes mechanism for closing the inlet valve and opening the outlet valve substantially simultaneously at bottom dead center of the piston stroke.

26. A hydraulic pump having a cylinder and a piston reciprocable relative to one another, inlet and outlet passages leading to and from said cylinder, inlet and outlet valves in said passages for controlling the flow of liquid to and from said pump cylinder, driving means for operating said valves from open to closed positions and from closed to open positions in predetermined timed relation with the stroke of the pump piston, said driving means including timing mechanism for opening said inlet valve at a fixed point in the piston cycle, namely on the suction stroke a predetermined interval after top dead center, and for closing said inlet valve and said outlet valve substantially at bottom dead center and top dead center, respectively, of said piston stroke.

27. A pump comprising a cylinder, a piston reciprocable in said cylinder, an inlet and outlet valve associated with said cylinder, a low pressure and a high pressure passage respectively connecting said valves with said cylinder, means for maintaining said low pressure passage filled with a supply of liquid adapted to be compressed by said piston for discharge through said high pressure passage, means for actuating said piston and valves, and timing means for opening and closing said valves in a predetermined sequence, said timing means foreshortening the open period of said inlet valve to substantially less than the intake stroke of said piston.

28. A pump comprising a cylinder, a piston reciprocable in said cylinder, an inlet and outlet valve associated with said cylinder, a low pressure and a high pressure passage respectively connecting said valves with said cylinder, means for maintaining said low pressure passage filled with a supply of liquid adapted to be compressed in said cylinder by said piston for discharge through said high pressure passage, means for actuating said piston and valves, and timing means for opening and closing said valves in a predetermined sequence, said timing means being arranged to foreshorten the normally open period of said inlet valve a predetermined amount thereof, so that the energy of the compressed liquid trapped in the cylinder following closure of the outlet valve is utilized to supply driving force to said piston before the inlet valve opens.

29. A pump comprising a cylinder, a piston reciprocable in said cylinder, an inlet and outlet valve associated with said cylinder, a low pressure and a high pressure passage respectively connecting said valves with said cylinder, means for maintaining said low pressure passage filled with a supply of liquid adapted to be compressed by said piston for discharge through said high pressure passage, adjustable means for actuating said piston, and timing means for respectively opening and closing said valves in a predetermined sequence, said timing means arranged to delay and foreshorten the opening period of said inlet valve a predetermined amount thereof, whereby the energy of the compressed liquid trapped in the cylinder is converted to driving said piston.

30. A pump comprising a cylinder, a piston reciprocable in said cylinder, an inlet and outlet valve associated with said cylinder, a low pressure and a high pressure passage respectively connecting said valves with said cylinder, means for maintaining said low pressure passage filled with a supply of liquid adapted to be compressed in said cylinder and high pressure passage by said piston, means for actuating said piston and valves, and timing means for respectively opening and closing said valves in a predetermined sequence, said timing means including an eccentric in which the eccentricity thereof is so disposed as to delay and foreshorten the normally open period of said inlet valve a predetermined portion thereof, so that the expansive energy of the compressed liquid trapped in said cylinder is utilized to apply driving force to said piston before the inlet valve opens.

31. A pump comprising a cylinder, a piston reciprocable in said cylinder, an inlet and outlet valve associated with said cylinder, a low pressure and a high pressure passage respectively connecting said valves with said cylinder, means for maintaining said low pressure passage filled with a supply of liquid adapted to be compressed by said piston for discharge through said high pressure passage, means for actuating said piston and valves, and timing means for respectively opening and closing said valves in a predetermined sequence, said timing means being adapted to delay and foreshorten the normally open period of said inlet valve a predetermined portion thereof, whereby the energy resulting from the elasticity of the liquid and cylinder is utilized to supply driving force to said piston.

32. A pump comprising a cylinder, a piston reciprocable in said cylinder, an inlet and outlet valve associated with said cylinder, a low pressure and a high pressure passage respectively connecting said valves with said cylinder, means for maintaining a supply of liquid in said low pressure passage adapted to be drawn into said cylinder, said liquid further adapted to be compressed by said piston and expelled into said high pressure passage, means for actuating said piston and valves, and timing means for respectively opening and closing said valves in a predetermined sequence, said timing means including an eccentric in which the eccentricity thereof is so disposed as to delay and foreshorten the normally open period of said inlet valve substantially 20°, so that the expansive energy of the compressed liquid trapped in said cylinder and the compressive energy of the cylinder are utilized to supply driving force to said piston.

33. A pump comprising a cylinder, a piston reciprocable in said cylinder, an inlet and outlet valve associated with said cylinder, a low pressure and a high pressure passage respectively connecting said valves with said cylinder, means for maintaining said low pressure passage filled with a supply of liquid adapted to be compressed in said cylinder by said piston for discharge through said high pressure passage, means including a shaft for driving said piston and valves, and timing means including a plurality of eccentrics disposed on said shaft for reciprocating respectively said valves and piston in a predetermined sequence, the eccentricity of said inlet valve eccentric lagging the eccentricity of said piston eccentric by substantially 100°, said inlet valve being adapted to delay and foreshorten the normally open period of said inlet valve a predetermined portion thereof, whereby the energy of the compressed liquid trapped in said cylinder is converted to driving said piston.

34. A pump comprising a cylinder, a piston reciprocable in said cylinder, an inlet and outlet valve associated with said cylinder, a low pressure and a high pressure passage respectively connecting said valves with said cylinder, means for maintaining a supply of liquid in said low pressure passage adapted to be drawn into said cylinder, said liquid adapted to be compressed by said piston and expelled into said high pressure passage, means for actuating said piston and valves, and timing means for respectively opening and closing said valves in a predetermined sequence, said timing means being arranged to prevent leakage of the compressed liquid trapped in said cylinder to said low pressure passage by foreshortening the normally open period of said inlet valve.

35. A pump comprising a cylinder, a piston reciprocable in said cylinder, an inlet and outlet valve associated with said cylinder, a low pressure and a high pressure passage respectively connecting said valves with said cylinder, means for maintaining a supply of liquid in said low pressure passage adapted to be drawn into said cylinder, said liquid adapted to be compressed and expelled by said piston into said high pressure passage, means for actuating said piston and valves, and timing means for respectively opening and closing said valves in a predetermined sequence, said timing means being arranged to prevent leakage of the compressed liquid trapped in said cylinder to said low pressure passage by delaying the opening of and foreshortening the normally open period of said inlet valve, the energy of said trapped cylinder liquid being utilized in driving said piston.

ELIAS ORSHANSKY, Jr.

REFERENCES CITED

The following references are of record in the file of this patent:

UNITED STATES PATENTS

| Number | Name | Date |
|---|---|---|
| 714,603 | Petsche | Nov. 25, 1907 |
| 1,149,728 | Cialo | Aug. 10, 1915 |
| 1,239,060 | Sundh | Sept. 4, 1917 |
| 1,455,443 | Mayer | May 15, 1923 |
| 1,522,349 | Vivarttas | Jan. 6, 1925 |
| 1,601,345 | Burtnett | Sept. 28, 1926 |
| 1,636,258 | Svartz | July 10, 1927 |
| 1,638,289 | Burtnett | Aug. 9, 1927 |
| 2,008,809 | Wyld | July 23, 1935 |
| 2,034,069 | Walti | Mar. 17, 1936 |
| 2,047,167 | Heller | July 7, 1936 |
| 2,139,965 | Ljungstrom | Dec. 13, 1938 |
| 2,168,850 | Towler et al. | Aug. 8, 1939 |
| 2,192,372 | Buckwalter | Mar. 5, 1940 |
| 2,192,387 | Schlaupitz | Mar. 5, 1940 |
| 2,256,324 | Orshansky | Sept. 16, 1941 |
| 2,348,958 | Celio | May 16, 1944 |
| 2,349,161 | Frimel | May 16, 1944 |